(12) United States Patent
Fike, III et al.

(10) Patent No.: US 9,140,900 B2
(45) Date of Patent: Sep. 22, 2015

(54) DISPLAYS HAVING SELF-ALIGNED APERTURES AND METHODS OF MAKING THE SAME

(75) Inventors: Eugene E. Fike, III, Amesbury, MA (US); John J. Fijol, Shrewsbury, MA (US); Timothy J. Brosnihan, Natick, MA (US); Jignesh Gandhi, Burlington, MA (US)

(73) Assignee: Pixtronix, Inc., San Diego, CA (US)

( * ) Notice: Subject to any disclaimer, the term of this patent is extended or adjusted under 35 U.S.C. 154(b) by 41 days.

(21) Appl. No.: 13/550,337

(22) Filed: Jul. 16, 2012

(65) Prior Publication Data
US 2013/0021662 A1    Jan. 24, 2013

Related U.S. Application Data

(60) Provisional application No. 61/509,766, filed on Jul. 20, 2011.

(51) Int. Cl.
| | |
|---|---|
| *G02B 26/00* | (2006.01) |
| *G02F 1/13* | (2006.01) |
| *G02F 1/135* | (2006.01) |
| *G02B 26/08* | (2006.01) |
| *G02B 26/02* | (2006.01) |
| *G09G 3/34* | (2006.01) |

(52) U.S. Cl.
CPC ............ *G02B 26/0841* (2013.01); *G02B 26/02* (2013.01); *G09G 3/3433* (2013.01)

(58) Field of Classification Search
CPC ... G02B 26/02; G02B 26/0841; G09G 3/3433
USPC .......... 359/291, 228, 267, 665, 894, 96, 290, 359/298; 349/2, 25, 30; 382/211
See application file for complete search history.

(56) References Cited

U.S. PATENT DOCUMENTS

| | | | |
|---|---|---|---|
| 4,810,619 A | 3/1989 | Pampalone et al. | |
| 5,010,027 A | 4/1991 | Possin et al. | |
| 5,784,189 A * | 7/1998 | Bozler et al. | ................. 359/254 |
| 6,194,323 B1 | 2/2001 | Downey et al. | |
| 7,123,216 B1 | 10/2006 | Miles | |

(Continued)

FOREIGN PATENT DOCUMENTS

| | | |
|---|---|---|
| JP | 2004030955 A | 1/2004 |
| JP | 2008060280 A | 3/2008 |

(Continued)

OTHER PUBLICATIONS

International Search Report and Written Opinion—PCT/US2012/047045—ISA/EPO—Nov. 23, 2012.

(Continued)

*Primary Examiner* — Scott J Sugarman
*Assistant Examiner* — Mustak Choudhury
(74) *Attorney, Agent, or Firm* — Edward A. Gordon; Foley & Lardner LLP

(57) ABSTRACT

A display for imaging includes an aperture layer and a set of light modulators. The aperture layer includes a light absorbing layer disposed over a light reflecting layer, each layer having a set of apertures defined therein. The light absorbing layer includes light absorbing material suspended in a photosensitive resin. The set of light modulators are for modulating light passing through the apertures defined in the aperture layer.

20 Claims, 23 Drawing Sheets

(56) References Cited

U.S. PATENT DOCUMENTS

| | | |
|---|---|---|
| 7,417,782 B2 | 8/2008 | Hagood et al. |
| 7,485,236 B2 | 2/2009 | Lin |
| 7,585,613 B2 | 9/2009 | Ogihara et al. |
| 2004/0051445 A1 | 3/2004 | Adachi |
| 2004/0100594 A1* | 5/2004 | Huibers et al. .................. 349/25 |
| 2006/0250325 A1 | 11/2006 | Hagood et al. |
| 2007/0002156 A1* | 1/2007 | Hagood et al. ................ 348/296 |
| 2007/0052660 A1 | 3/2007 | Montbach et al. |
| 2008/0231938 A1 | 9/2008 | Pan |
| 2008/0278798 A1 | 11/2008 | Hagood et al. |
| 2009/0244678 A1 | 10/2009 | Hagood et al. |
| 2011/0267668 A1 | 11/2011 | Hagood et al. |

FOREIGN PATENT DOCUMENTS

| | | |
|---|---|---|
| JP | 2008242451 A | 10/2008 |
| JP | 2010181601 A | 8/2010 |
| JP | 2011059282 A | 3/2011 |
| TW | 200422991 A | 11/2004 |
| WO | 03007049 | 1/2003 |
| WO | 2006091860 A2 | 8/2006 |
| WO | 2006091904 | 8/2006 |
| WO | 2008091339 A2 | 7/2008 |

OTHER PUBLICATIONS

Taiwan Search Report—TW101125716—TIPO—Mar. 17, 2015.

* cited by examiner

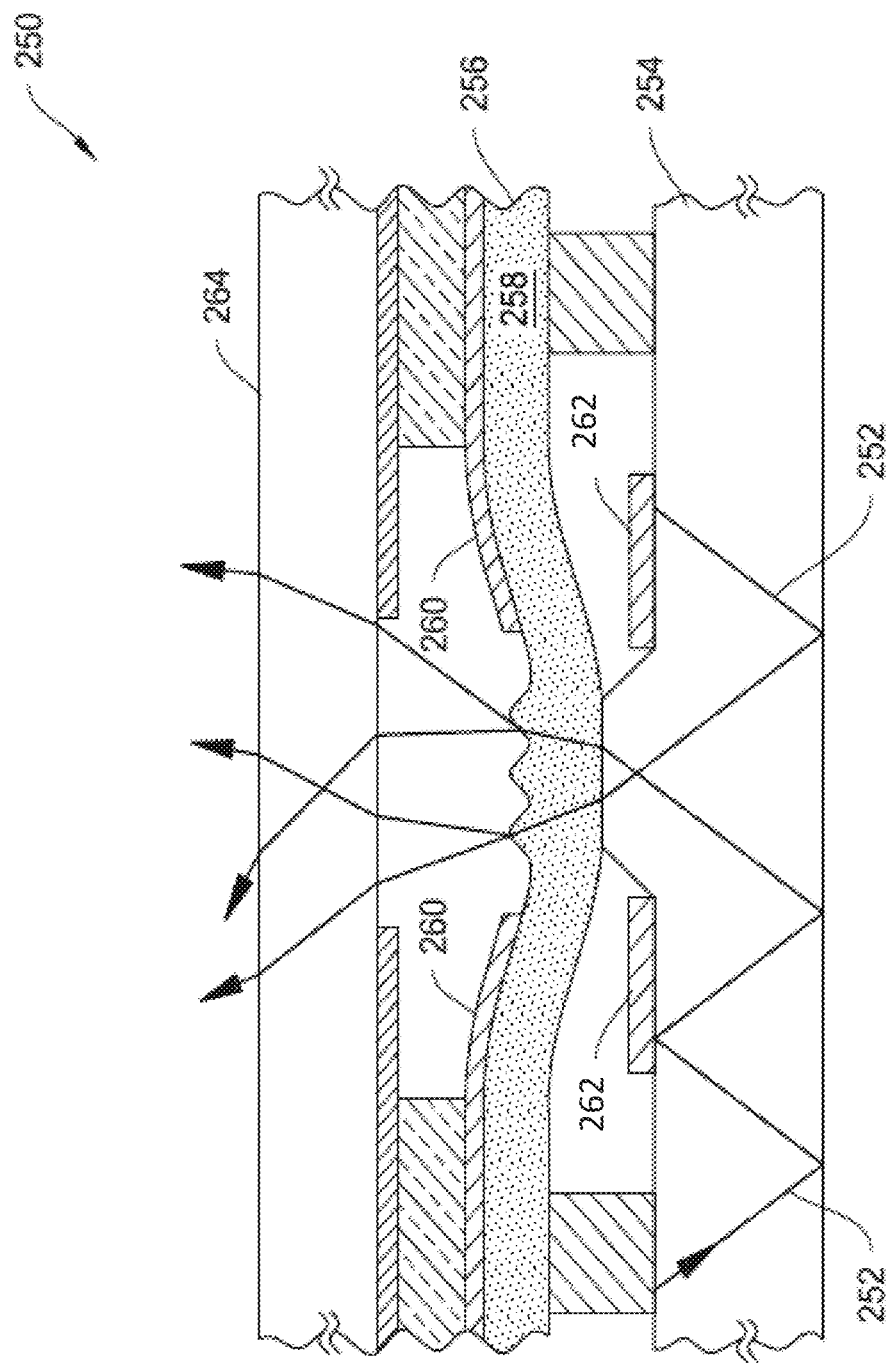

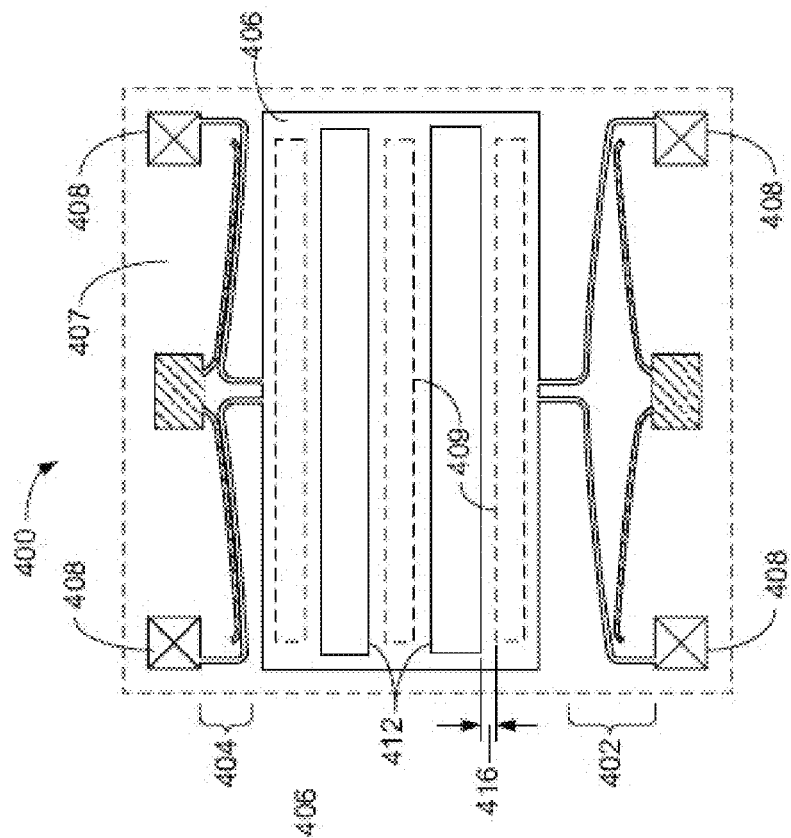
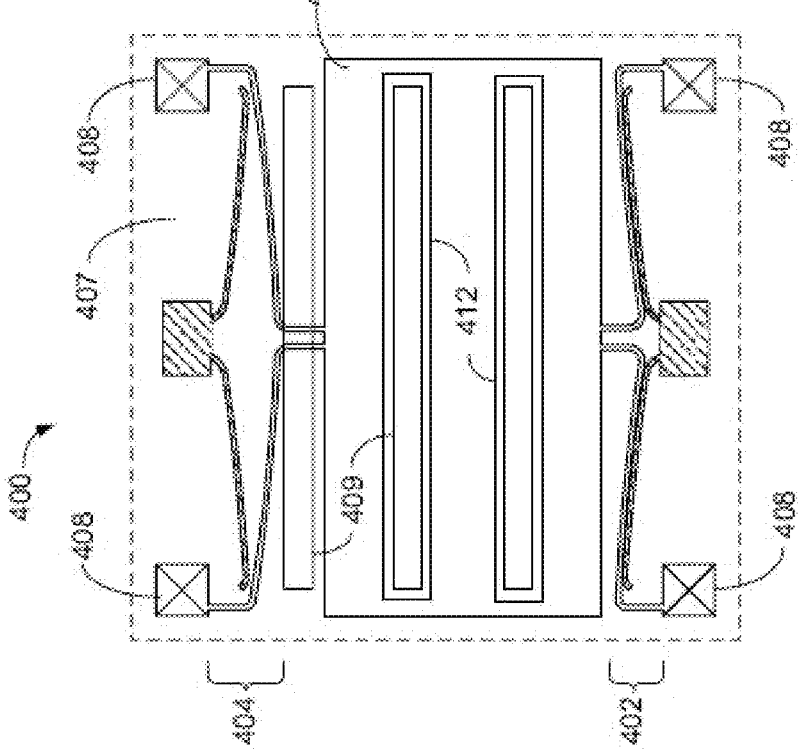

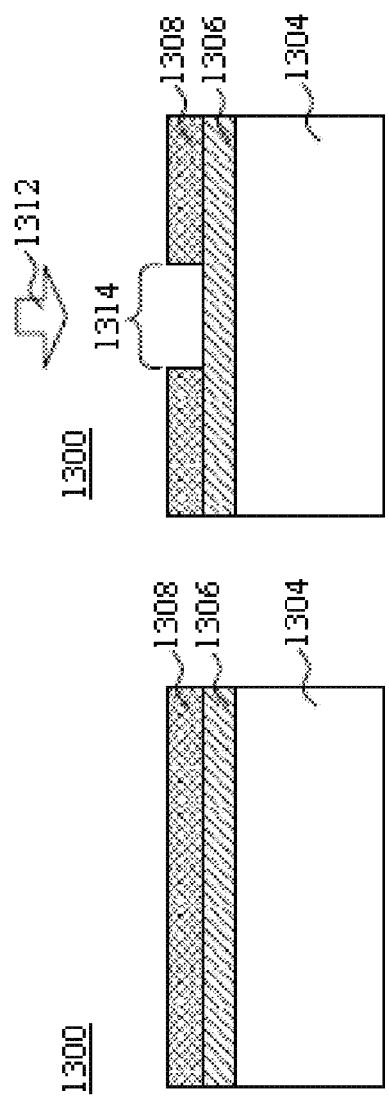
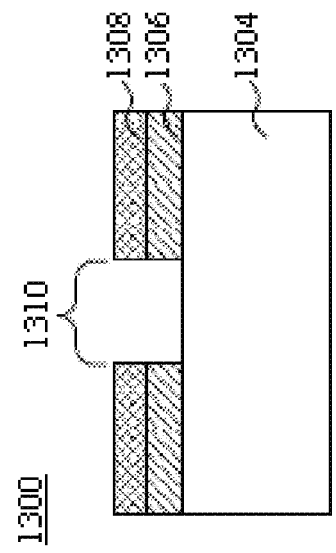
Figure 13A
Figure 13B
Figure 13C

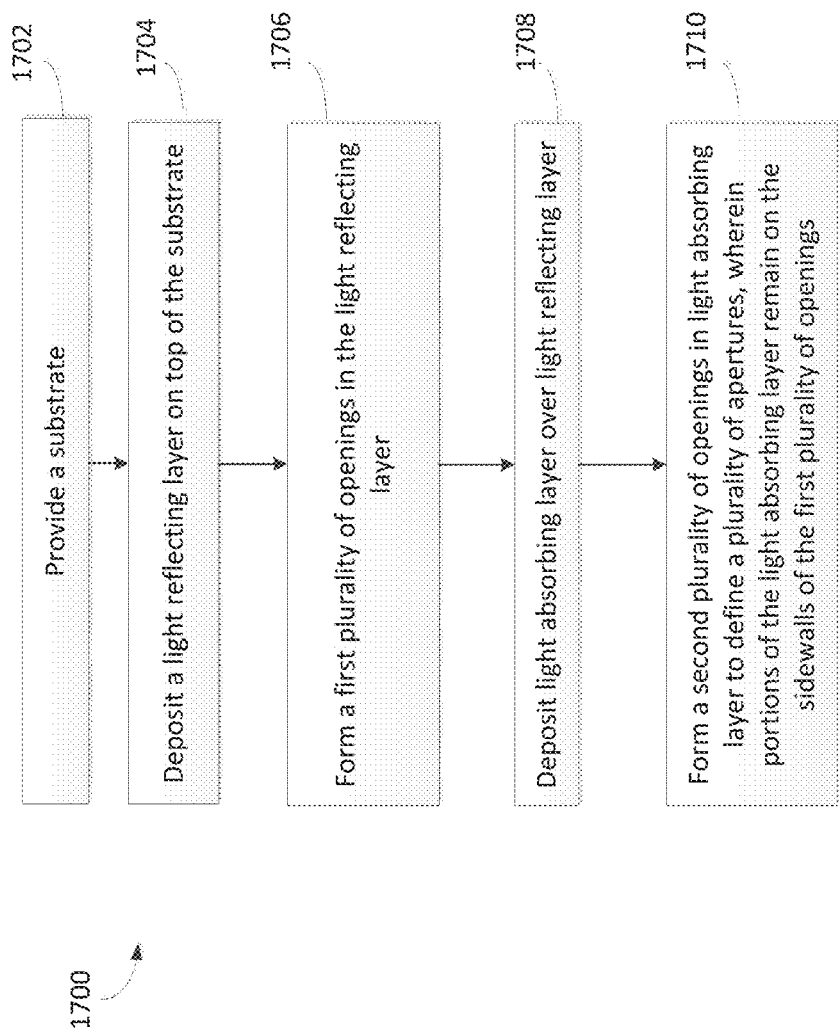

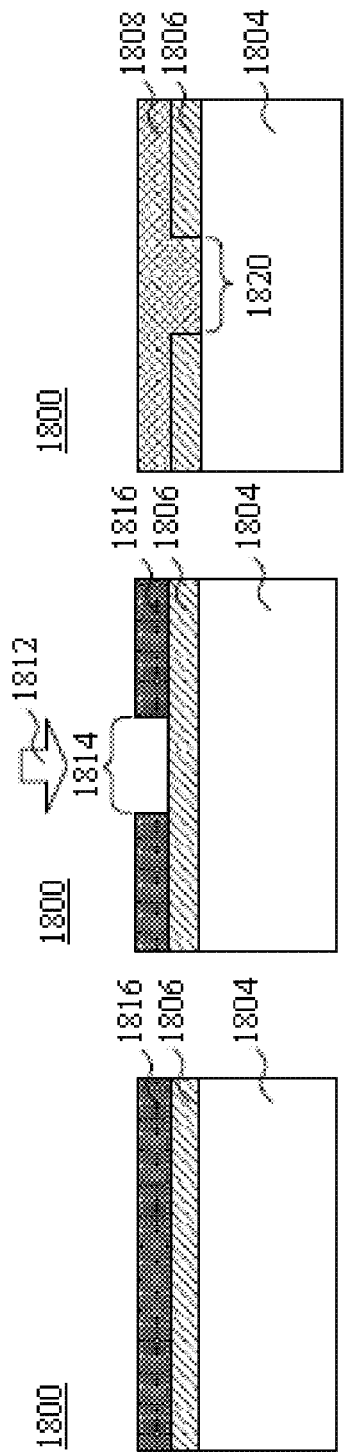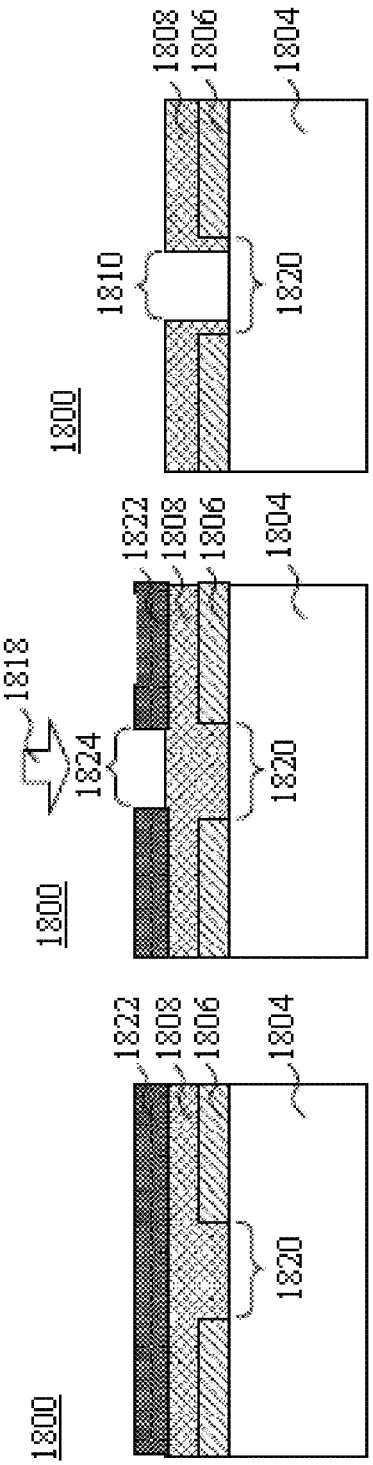
Figure 18A Figure 18B Figure 18C Figure 18D Figure 18E Figure 18F

DISPLAYS HAVING SELF-ALIGNED APERTURES AND METHODS OF MAKING THE SAME

CROSS-REFERENCE TO RELATED APPLICATIONS

This Patent Application claims priority to U.S. Provisional Patent Application No. 61/509,766, filed on Jul. 20, 2011, entitled "Displays and Methods of Making The Same." The disclosure of the prior Application is considered part of and is incorporated by reference in its entirety in this Patent Application.

TECHNICAL FIELD

This disclosure relates to the field of imaging displays. In particular, the invention relates to aperture layers incorporated into imaging displays.

DESCRIPTION OF THE RELATED TECHNOLOGY

Some displays are built with aperture layers that include a light absorbing layer and a light reflecting layer. The aperture layers include apertures formed through each layer to allow the passage of light. Previously, when such layers were deposited and patterned to form the aforementioned apertures, difficulties have arisen due to manufacturing tolerances and equipment variations. Namely, the apertures in each of the layers were not well aligned. This misalignment causes an undesirable blockage of portions of the apertures resulting in decreased light throughput through the aperture layer. In addition, poor alignment can result in a failure to fully cover portions of the reflective layer, resulting in undesirable reflections that reduce the display's contrast ratio.

SUMMARY

The systems, methods and devices of the disclosure each have several innovative aspects, no single one of which is solely responsible for the desirable attributes disclosed herein.

One innovative aspect of the subject matter described in this disclosure can be implemented in a display. The display includes an aperture layer and a plurality of light modulators. The aperture layer includes a light absorbing layer disposed over a light reflecting layer. Each layer has a plurality of apertures defined therein. The light absorbing layer includes light absorbing material suspended in a photosensitive resin. The set of light modulators modulate light passing through the apertures defined in the aperture layer.

In some implementations, the apertures in each of the light absorbing layer and the light reflecting layer are substantially aligned. In some implementations, the light modulators include microelectromechanical system (MEMS)-based light modulators. In some implementations, the light modulators include shutter-based light modulators. In some implementations, the light absorbing layer includes a patternable photoresist.

In some implementations, at least one layer of the light absorbing layer coats the sides of the apertures defined in the light reflecting layer. In some implementations, the light absorbing layer includes at least two light absorbing layers. In some implementations, the light reflecting layer includes at least two light reflecting layers. In some implementations, the light reflecting layer includes a dielectrically enhanced metal mirror. The dielectrically enhanced metal mirror includes a metal layer and a multiple layer stack of dielectric material layers. The multiple layer stack of dielectric material layers has alternating refractive indices. In some implementations, the multiple layer stack of dielectric material layers includes at least one first refractive index layer formed of a material having a first refractive index that is greater than 2.0 and at least one second refractive index layer formed of material having a second refractive index that is less than 1.8.

Another innovative aspect of the subject matter described in this disclosure can be implemented in a display. The display includes an aperture layer and a plurality of light modulators. The aperture layer includes a light absorbing layer disposed over a light reflecting layer. The light reflecting layer defines a plurality of apertures. At least one layer of the light absorbing layer coats the sides of the apertures defined in the light reflecting layer. The plurality of light modulators are for modulating light passing through the apertures defined in the aperture layer.

In some implementations, the light modulators include MEMS-based light modulators. In some implementations, the light modulators include shutter-based light modulators. In some implementations, the light absorbing layer includes one of a photosensitive resin and a patternable photoresist. In some implementations, the light absorbing layer includes at least two light absorbing layers. Another innovative aspect of the subject matter described in this disclosure can be implemented in a method of forming an aperture layer for a display. The method includes providing a substrate. A light reflecting layer is then deposited on the substrate. Afterwards, a light absorbing layer is permanently deposited over the light reflecting layer. A first plurality of openings is then formed in one of the light absorbing layer and the light reflecting layer. A second plurality of openings is then formed in the other of the light absorbing layer and the light reflecting layer using the first plurality of openings as one of a photomask and an etch mask.

In some implementations, the first plurality of opening is formed in the light absorbing layer, and the second plurality of openings is formed in the light reflecting layer by using the first plurality of openings in the light absorbing layer as an etch mask. In some implementations, forming the first plurality of openings in the light absorbing layer uncovers portions of the light reflecting layer through the first plurality of openings. Forming the second plurality of openings includes removing the portions of the light reflecting layer uncovered by the first plurality of openings.

In some implementations, the first plurality of openings is formed in the light reflecting layer, and the second plurality of openings is formed in the light absorbing layer by using the first plurality of openings in the light reflecting layer as a photo mask. In some implementations, the light absorbing layer includes a photosensitive material and forming the second plurality of openings in the light absorbing layer includes photo-patterning the first plurality of openings in the photosensitive material through the first plurality of openings. In some implementations, forming the second plurality of openings in the light reflecting layer includes etching the first plurality of openings in the light reflecting layer prior to depositing the light absorbing layer over the light reflecting layer. In some implementations, forming the second plurality of openings in the light absorbing layer includes patterning the light absorbing layer by exposing the light absorbing layer to light through a rear surface of the substrate and through the first plurality of openings in the light reflecting layer. In some implementations, the second plurality of openings is formed such that the second plurality of openings is substantially aligned with the first plurality of openings.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCD), organic light emitting diodes (OLED), electrophoretic, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

FIG. 2C shows a cross sectional view of an illustrative non shutter-based microelectromechanical systems (MEMS) light modulator.

FIGS. 4A and 4B show example views of a dual actuator shutter assembly.

FIGS. 13A-13C show stages of the process depicted in FIG. 12 for forming a self-aligned aperture layer structure.

FIG. 17 shows a flow diagram of an example process for forming an aperture layer structure.

FIGS. 18A-F show stages of the process depicted in FIG. 17 for forming an aperture layer structure.

DETAILED DESCRIPTION

Figure 1A:
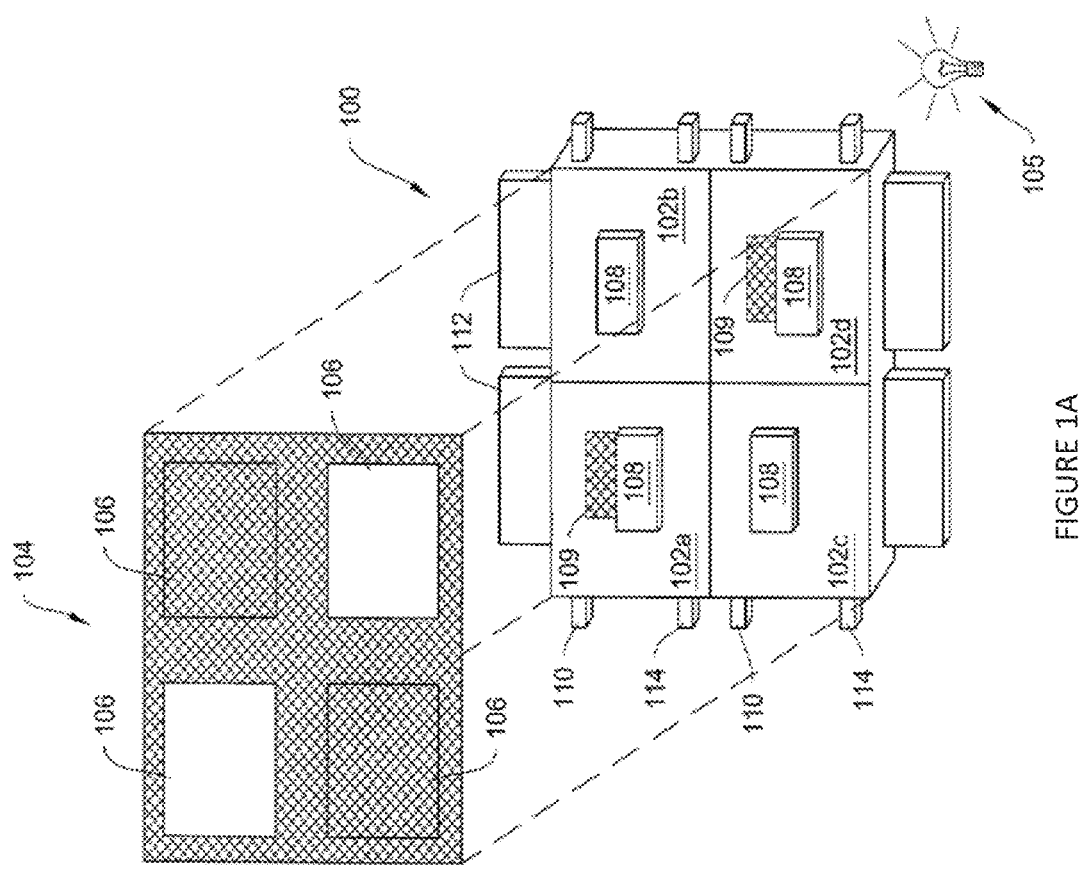
FIG. 1A shows an example schematic diagram of a direct-view MEMS-based display apparatus.

Some displays include aperture layers that limit the emission of light from a backlight to a set of desired emission locations. Such aperture layers can include a light absorbing layer and a light reflecting layer. Apertures are formed through each layer to allow the passage of light at the desired locations. This disclosure relates to aperture layers that include apertures that are self-aligned through multiple film layers for use in displays. This application is also related to methods for making such aperture layers.

The methods disclosed herein for forming aperture layers prevent misalignment and result in a light absorbing layer and a light reflecting layer that have substantially aligned apertures. In some implementations, the method includes providing a substrate, providing a light reflecting layer on the substrate, and providing a light absorbing layer over the light reflecting layer. A first set of openings are then formed in the light absorbing layer and a second set of openings are formed in the light reflecting layer so as to form a set of apertures. The first set of openings in the light absorbing layer and the second set of openings in the light reflecting layer are substantially aligned. Some implementations of such a method can be characterized as self-aligned aperture formation processes. In such implementations, apertures formed in one of the layers that make up the aperture layer, i.e., either the reflective layer or the light absorbing layer, are used to pattern the apertures in the other layer of the aperture layer.

In some implementations, the light absorbing layer is made of a photosensitive material which can be directly patterned to form apertures within the layer without a separate resist being applied. The photosensitive material may include materials such as a photoresist or a light absorbing material that may be suspended in a photosensitive resin. The resulting patterned light absorbing layer then serves as an etch mask for the underlying metal layer to result in self-aligned apertures. In some other implementations, the light reflecting layer serves as a photomask for patterning the light absorbing layer. The light absorbing layer may be patterned by exposing the light absorbing layer to light from the rear surface of the underlying substrate through apertures previously etched into the layer of the light reflecting material. In some implementations, at least one layer of the light absorbing layer coats the sides of the set of apertures defined in the light reflecting layer.

Particular implementations of the subject matter described in this disclosure can be implemented to realize one or more of the following potential advantages. In some implementations, self-aligned apertures allow more efficient light throughput to occur through the aperture layer by avoiding undesirable blockage of portions of the apertures. Such blockage would otherwise result in decreased light throughput through the aperture layer. Improved alignment also helps avoid reflections off of unintentionally uncovered portions of the light reflecting layer that can result from poor alignment. In some implementations, portions of the light absorbing layer coat the sidewalls of the apertures defined in the light reflecting layer. This coating prevents undesirable side reflections and refractions of light passing through the apertures. Together these optical benefits yield increased display efficiency and improved contrast ratio.

In some implementations, the aperture layer manufacture processes described herein reduce the number of process stages used to form an aperture layer. In some implementations, the light absorbing layer can be patterned without the application and patterning of a separate resist layer. In addition, in implementations in which the light absorbing layer serves as an etch mask for the light reflective layer, the stages of applying and patterning a separate resist layer for etching the light reflective layer can also be avoided. In other implementations in which the light reflecting layer serves as an etch mask for the light absorbing layer, the application and patterning of a resist layer for etching the light absorbing layer can be avoided.

FIG. 1A shows a schematic diagram of a direct-view MEMS-based display apparatus 100. The display apparatus 100 includes a plurality of light modulators 102a-102d (generally "light modulators 102") arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (e.g., interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
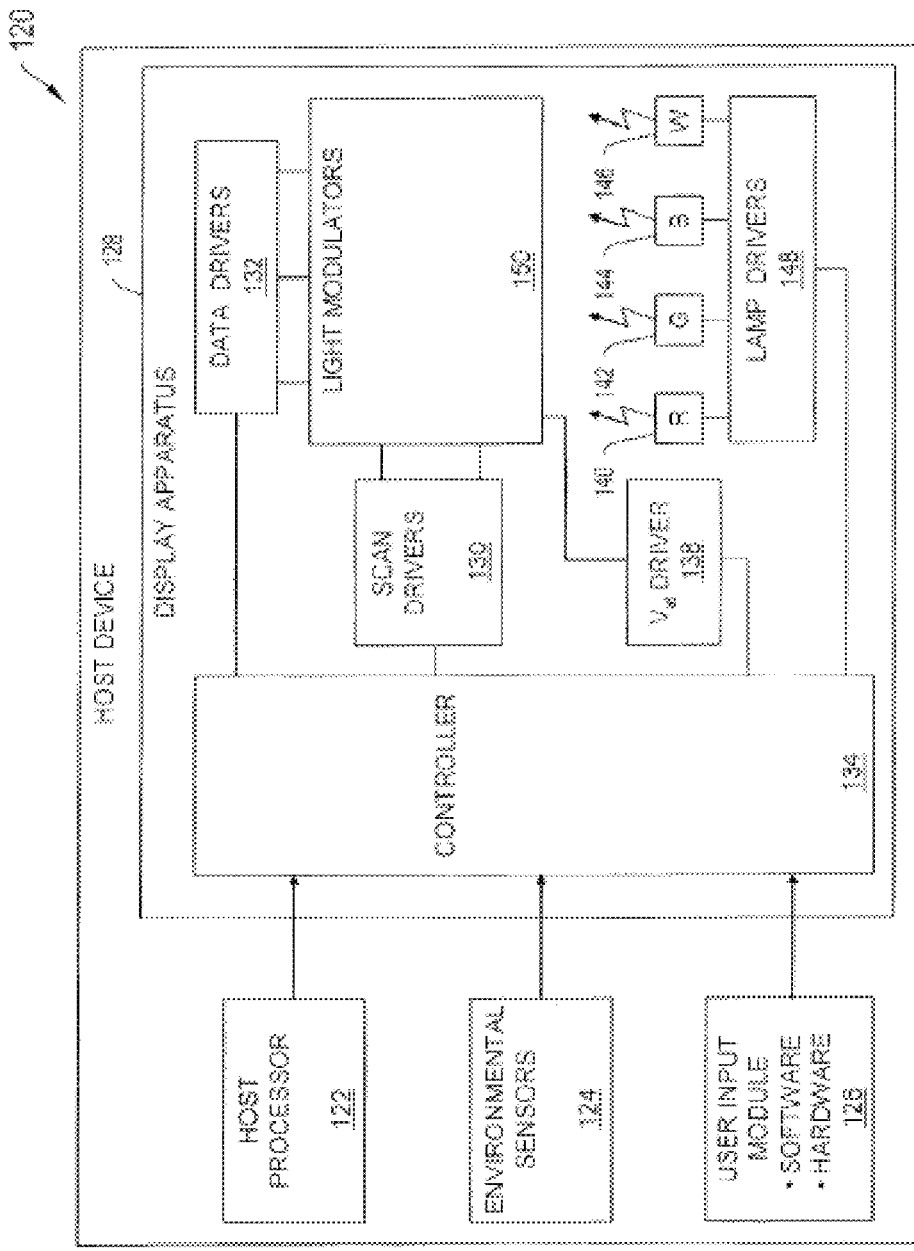
FIG. 1B shows an example block diagram of a host device.

FIG. 1B shows an example of a block diagram 120 of a host device (i.e., cell phone, smart phone, PDA, MP3 player, tablet, e-reader, etc.). The host device includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, lamp drivers 148 and light modulators 150. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the light modulators, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in predetermined sequences grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all light modulators within the array of light modulators, for instance by supplying voltage to a series of common interconnects 114. In some other implementations, the common drivers 138, following commands from the controller 134, issue voltage pulses or signals to the array of light modulators, for instance global actuation pulses which are capable of driving and/or initiating simultaneous actuation of all light modulators in multiple rows and columns of the array.

All of the drivers (e.g., scan drivers 130, data drivers 132 and common drivers 138) for different display functions are time-synchronized by the controller 134. Timing commands from the controller coordinate the illumination of red, green and blue and white lamps (140, 142, 144 and 146 respectively) via lamp drivers 148, the write-enabling and sequencing of specific rows within the array of pixels, the output of voltages from the data drivers 132, and the output of voltages that provide for light modulator actuation.

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array is synchronized with the illumination of the lamps 140, 142, 144 and 146 such that alternate image frames are illuminated with an alternating series of colors, such as red, green, and blue. The image frames for each respective color is referred to as a color subframe. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 134 forms an image by the method of time division gray scale, as previously described. In some other implementations, the display apparatus 100 can provide gray scale through the use of multiple shutters 108 per pixel.

In some implementations, the data for an image state 104 is loaded by the controller 134 to the modulator array by a sequential addressing of individual rows, also referred to as scan lines. For each row or scan line in the sequence, the scan driver 130 applies a write-enable voltage to the write enable interconnect 110 for that row of the array, and subsequently the data driver 132 supplies data voltages, corresponding to desired shutter states, for each column in the selected row. This process repeats until data has been loaded for all rows in the array. In some implementations, the sequence of selected rows for data loading is linear, proceeding from top to bottom in the array. In some other implementations, the sequence of selected rows is pseudo-randomized, in order to minimize visual artifacts. And in some other implementations the sequencing is organized by blocks, where, for a block, the data for only a certain fraction of the image state 104 is loaded to the array, for instance by addressing only every $5^{th}$ row of the array in sequence.

In some implementations, the process for loading image data to the array is separated in time from the process of actuating the shutters 108. In these implementations, the modulator array may include data memory elements for each pixel in the array and the control matrix may include a global actuation interconnect for carrying trigger signals, from common driver 138, to initiate simultaneous actuation of shutters 108 according to data stored in the memory elements.

In alternative implementations, the array of pixels and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The host processor 122 generally controls the operations of the host. For example, the host processor may be a general or special purpose processor for controlling a portable electronic device. With respect to the display apparatus 128, included within the host device 120, the host processor outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device. The environmental sensor module receives data about the ambient environment, such as temperature and or ambient lighting conditions. The sensor module 124 can be programmed to distinguish whether the device is operating in an indoor or office environment versus an outdoor environment in bright daylight versus and outdoor environment at nighttime. The sensor module communicates this information to the display controller 134, so that the controller can optimize the viewing conditions in response to the ambient environment.

Figure 2A:
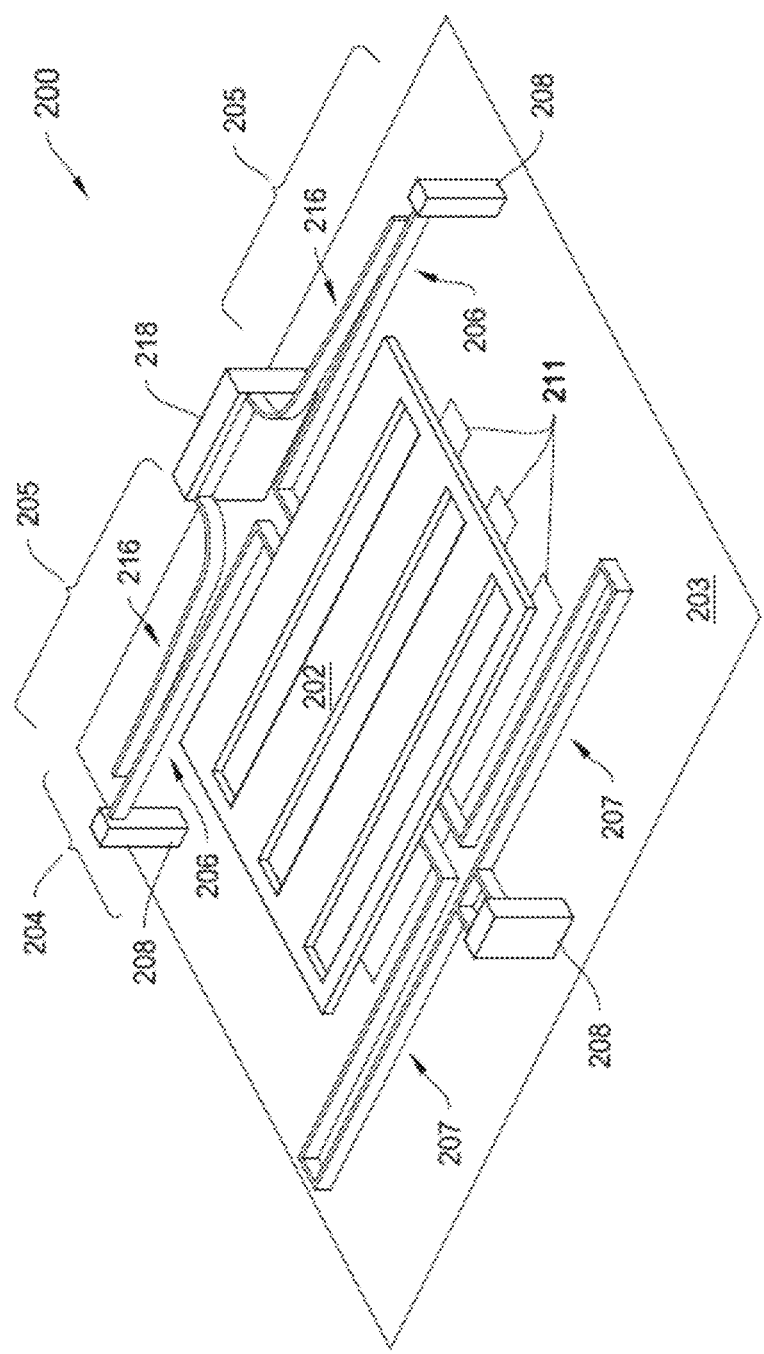
FIG. 2A shows an example perspective view of an illustrative shutter-based light modulator.

FIG. 2A shows a perspective view of an illustrative shutter-based light modulator 200. The shutter-based light modulator is suitable for incorporation into the direct-view MEMS-based display apparatus 100 of FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate. If the substrate is transparent, such as glass or plastic, then the aperture holes 211 are formed in a layer of light-blocking material deposited on the substrate. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 potential is removed, the load beams 206 push the shutter 202 back into its initial position, releasing the stress stored in the load beams 206.

A light modulator, such as light modulator 200, incorporates a passive restoring force, such as a spring, for returning a shutter to its rest position after voltages have been removed. Other shutter assemblies can incorporate a dual set of "open" and "closed" actuators and a separate sets of "open" and "closed" electrodes for moving the shutter into either an open or a closed state.

There are a variety of methods by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve the speed, the luminance level and/or the power dissipation performance of the display.

Figure 2B:
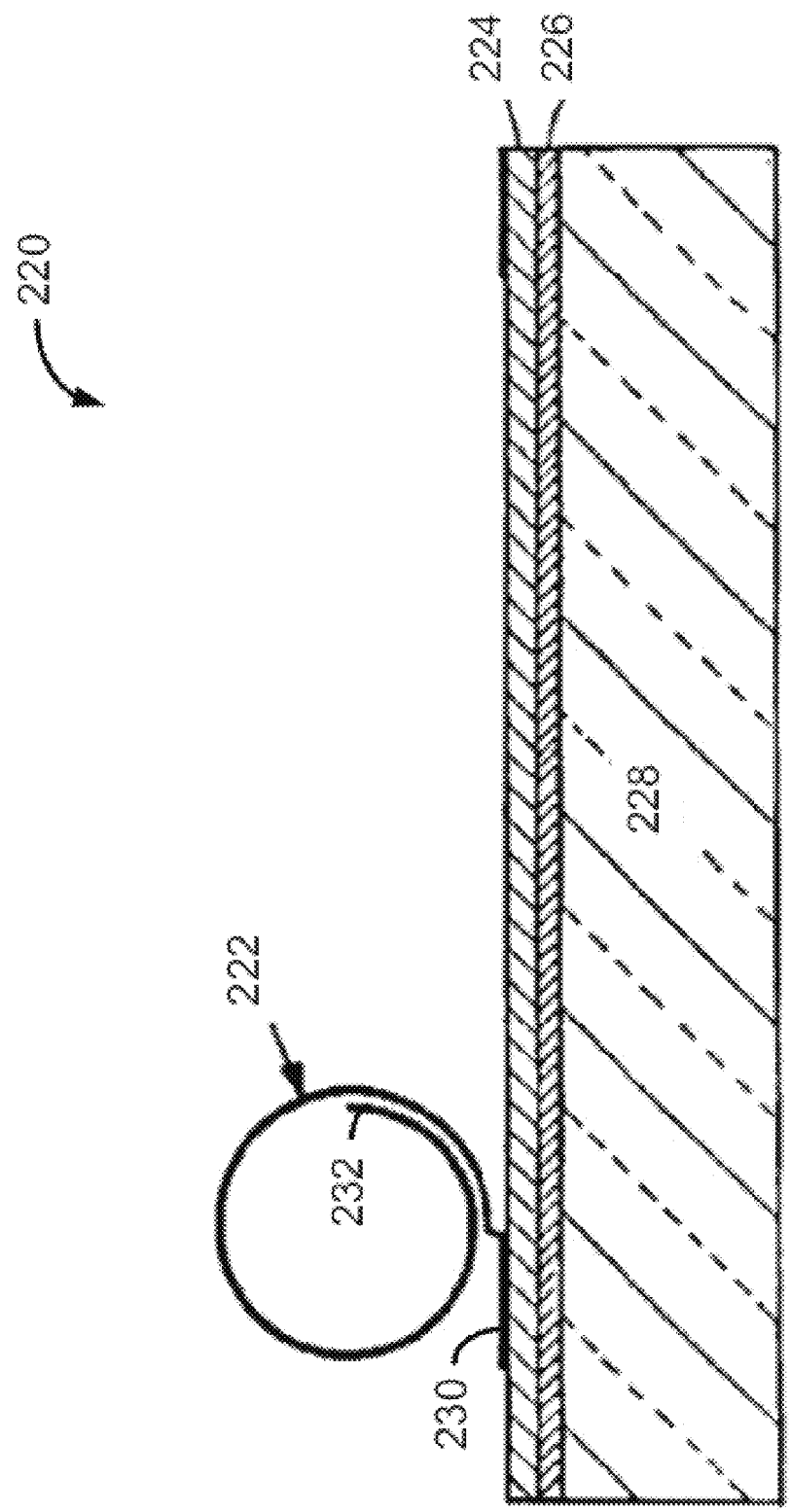
FIG. 2B shows a cross sectional view of a rolling actuator shutter-based light modulator.

The display apparatus 100, in alternative implementations, includes light modulators other than transverse shutter-based light modulators, such as the shutter assembly 200 described above. For example, FIG. 2B shows a cross sectional view of a rolling actuator shutter-based light modulator 220. The rolling actuator shutter-based light modulator 220 is suitable for incorporation into an alternative implementation of the MEMS-based display apparatus 100 of FIG. 1A. A rolling actuator-based light modulator includes a movable electrode disposed opposite a fixed electrode and biased to move in a particular direction to function as a shutter upon application of an electric field. In some implementations, the light modulator 220 includes a planar electrode 226 disposed between a substrate 228 and an insulating layer 224 and a movable electrode 222 having a fixed end 230 attached to the insulating layer 224. In the absence of any applied voltage, a movable end 232 of the movable electrode 222 is free to roll towards the fixed end 230 to produce a rolled state. Application of a voltage between the electrodes 222 and 226 causes the movable electrode 222 to unroll and lie flat against the insulating layer 224, whereby it acts as a shutter that blocks light traveling through the substrate 228. The movable electrode 222 returns to the rolled state by means of an elastic restoring force after the voltage is removed. The bias towards a rolled state may be achieved by manufacturing the movable electrode 222 to include an anisotropic stress state.

FIG. 2C shows a cross sectional view of an illustrative non shutter-based MEMS light modulator 250. The light tap modulator 250 is suitable for incorporation into an alternative implementation of the MEMS-based display apparatus 100 of FIG. 1A. A light tap works according to a principle of frustrated total internal reflection (TIR). That is, light 252 is introduced into a light guide 254, in which, without interference, light 252 is, for the most part, unable to escape the light guide 254 through its front or rear surfaces due to TIR. The light tap 250 includes a tap element 256 that has a sufficiently high index of refraction that, in response to the tap element 256 contacting the light guide 254, the light 252 impinging on the surface of the light guide 254 adjacent the tap element 256 escapes the light guide 254 through the tap element 256 towards a viewer, thereby contributing to the formation of an image.

In some implementations, the tap element 256 is formed as part of a beam 258 of flexible, transparent material. Electrodes 260 coat portions of one side of the beam 258. Opposing electrodes 262 are disposed on the light guide 254. By applying a voltage across the electrodes 260 and 262, the position of the tap element 256 relative to the light guide 254 can be controlled to selectively extract light 252 from the light guide 254.

Figure 2D:
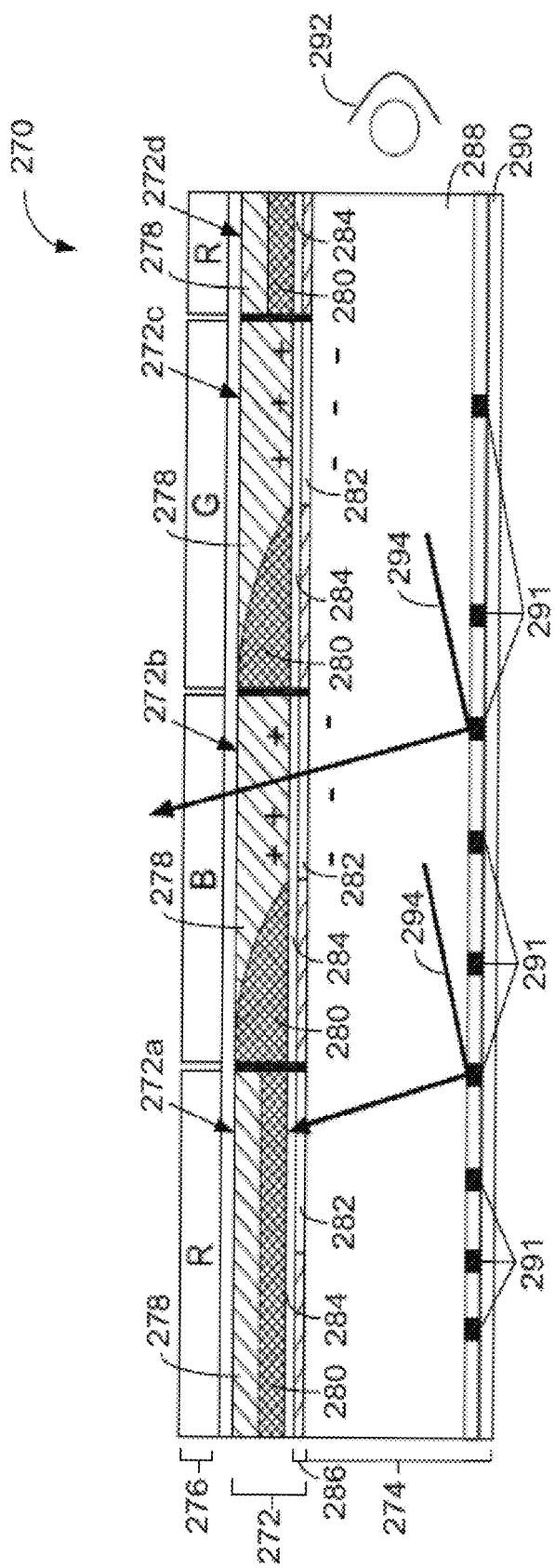
FIG. 2D shows a cross sectional view of an electrowetting-based light modulation array.

FIG. 2D shows an example cross sectional view of an electrowetting-based light modulation array 270. The electrowetting-based light modulation array 270 is suitable for incorporation into an alternative implementation of the MEMS-based display apparatus 100 of FIG. 1A. The light modulation array 270 includes a plurality of electrowetting-based light modulation cells 272a-d (generally "cells 272") formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide (ITO)) and an insulating layer 284 positioned between the layer of light absorbing oil 280 and the transparent electrode 282. In the implementation described herein, the electrode takes up a portion of a rear surface of a cell 272.

The remainder of the rear surface of a cell 272 is formed from a reflective aperture layer 286 that forms the front surface of the optical cavity 274. The reflective aperture layer 286 is formed from a reflective material, such as a reflective metal or a stack of thin films forming a dielectric mirror. For each cell 272, an aperture is formed in the reflective aperture layer 286 to allow light to pass through. The electrode 282 for the cell is deposited in the aperture and over the material forming the reflective aperture layer 286, separated by another dielectric layer.

The remainder of the optical cavity 274 includes a light guide 288 positioned proximate the reflective aperture layer 286, and a second reflective layer 290 on a side of the light guide 288 opposite the reflective aperture layer 286. A series of light redirectors 291 are formed on the rear surface of the light guide, proximate the second reflective layer. The light redirectors 291 may be either diffuse or specular reflectors. One or more light sources 292, such as LEDs, inject light 294 into the light guide 288.

In an alternative implementation, an additional transparent substrate (not shown) is positioned between the light guide 288 and the light modulation array 270. In this implementation, the reflective aperture layer 286 is formed on the additional transparent substrate instead of on the surface of the light guide 288.

In operation, application of a voltage to the electrode 282 of a cell (for example, cell 272b or 272c) causes the light absorbing oil 280 in the cell to collect in one portion of the cell 272. As a result, the light absorbing oil 280 no longer obstructs the passage of light through the aperture formed in the reflective aperture layer 286 (see, for example, cells 272b and 272c). Light escaping the backlight at the aperture is then able to escape through the cell and through a corresponding color filter (for example, red, green or blue) in the set of color filters 276 to form a color pixel in an image. When the electrode 282 is grounded, the light absorbing oil 280 covers the aperture in the reflective aperture layer 286, absorbing any light 294 attempting to pass through it.

The area under which oil 280 collects when a voltage is applied to the cell 272 constitutes wasted space in relation to forming an image. This area is non-transmissive, whether a voltage is applied or not. Therefore, without the inclusion of the reflective portions of reflective apertures layer 286, this area absorbs light that otherwise could be used to contribute to the formation of an image. However, with the inclusion of the reflective aperture layer 286, this light, which otherwise would have been absorbed, is reflected back into the light guide 290 for future escape through a different aperture. The electrowetting-based light modulation array 270 is not the only example of a non-shutter-based MEMS modulator suitable for inclusion in the display apparatus described herein. Other forms of non-shutter-based MEMS modulators could likewise be controlled by various ones of the controller functions described herein without departing from the scope of this disclosure.

Figure 3A:
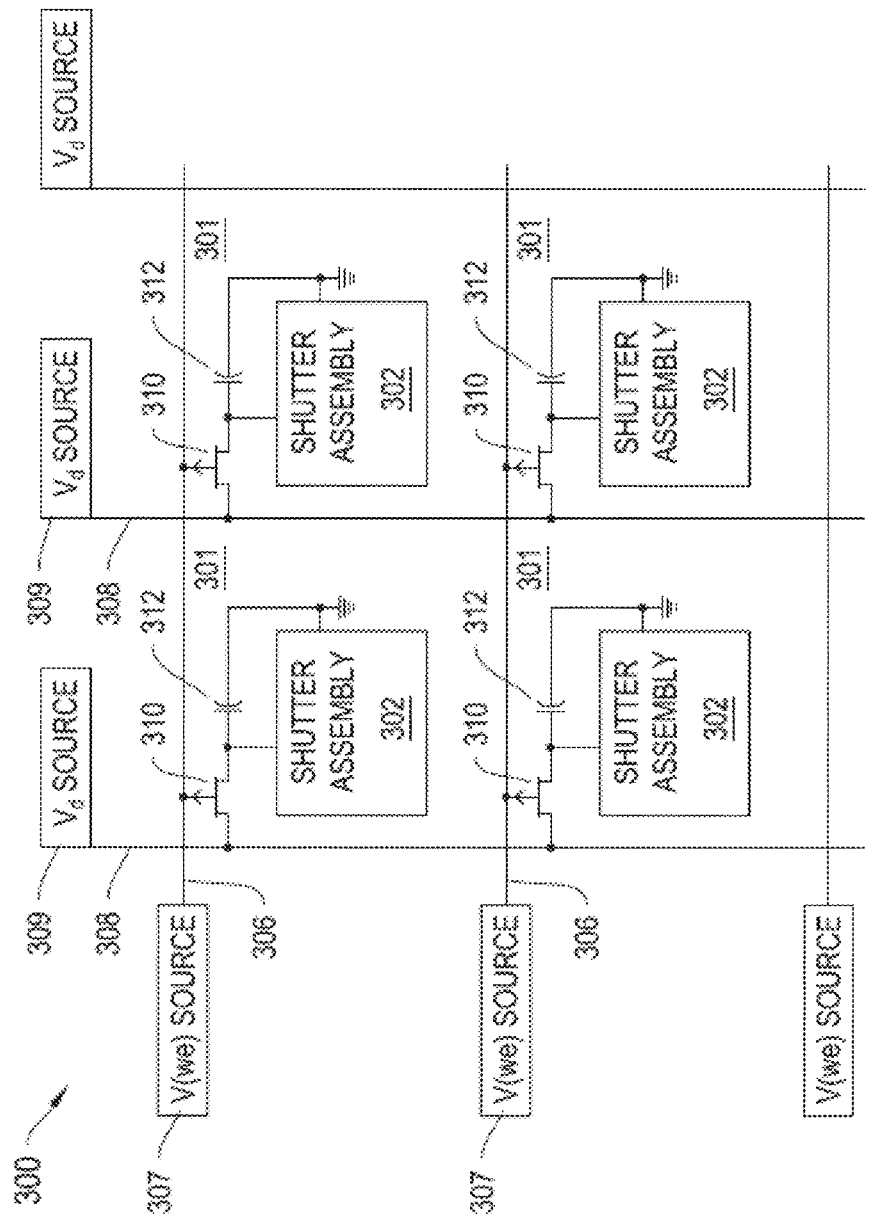
FIG. 3A shows an example schematic diagram of a control matrix.
Figure 3B:
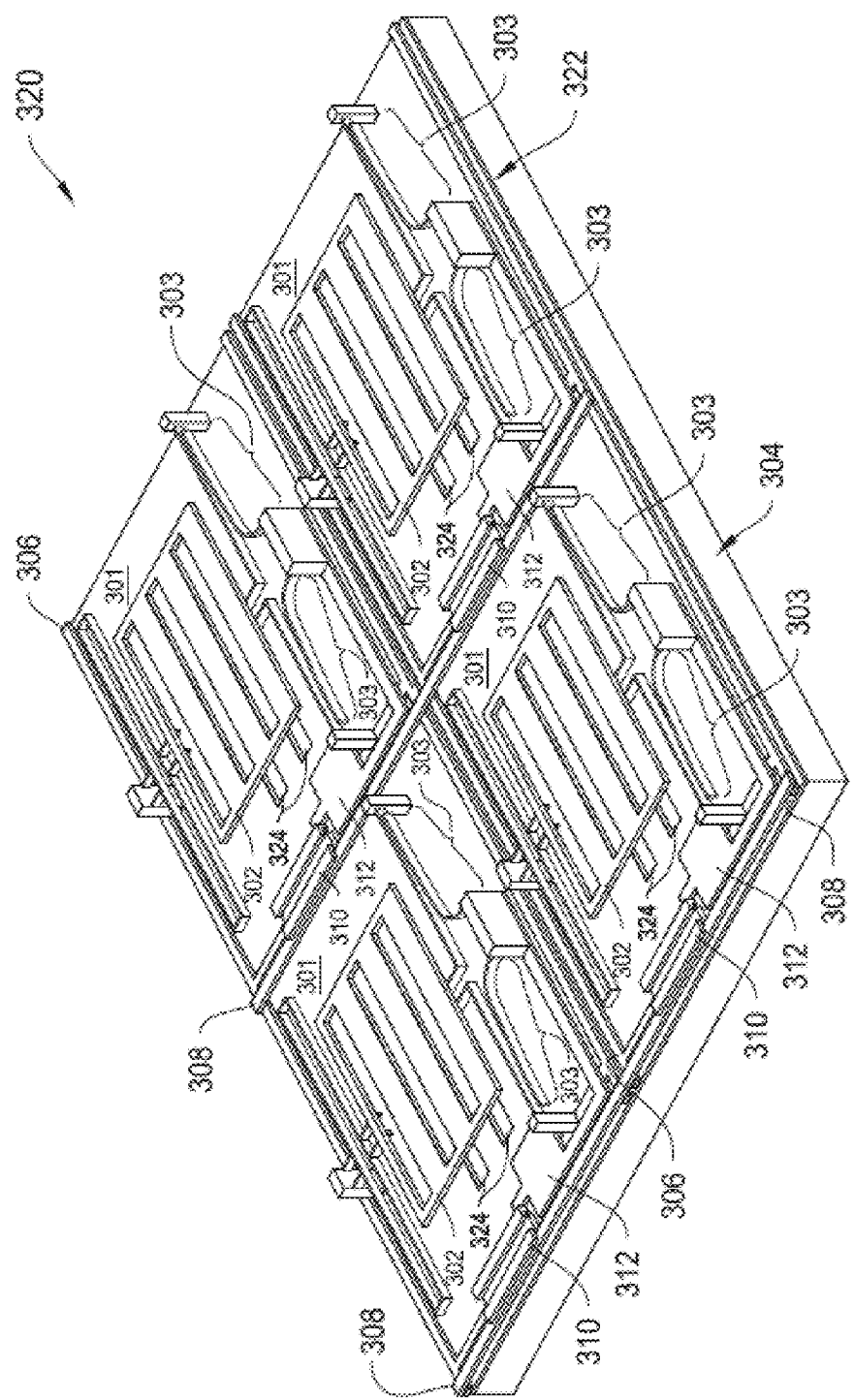
FIG. 3B shows a perspective view of an array of shutter-based light modulators connected to the control matrix of FIG. 3A.

FIG. 3A shows an example schematic diagram of a control matrix 300. The control matrix 300 is suitable for controlling the light modulators incorporated into the MEMS-based display apparatus 100 of FIG. 1A. FIG. 3B shows a perspective view of an array 320 of shutter-based light modulators connected to the control matrix 300 of FIG. 3A. The control matrix 300 may address an array of pixels 320 (the "array 320"). Each pixel 301 can include an elastic shutter assembly 302, such as the shutter assembly 200 of FIG. 2A, controlled by an actuator 303. Each pixel also can include an aperture layer 322 that includes apertures 324.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source 309 ("$V_d$ source") to the pixels 301 in a corresponding column of pixels. In the control matrix 300, the $V_d$ source 309 provides the majority of the energy to be used for actuation of the shutter assemblies 302. Thus, the data voltage source, $V_d$ source 309, also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly actuates, opening the shutter in that shutter assembly 302. The voltage applied to the data interconnect 308 remains stored in the capacitor 312 of the pixel 301 even after the control matrix 300 ceases to apply $V_{we}$ to a row. Therefore, the voltage $V_{we}$ does not have to wait and hold on a row for times long enough for the shutter assembly 302 to actuate; such actuation can proceed after the write-enabling voltage has been removed from the row. The capacitors 312 also function as memory elements within the array 320, storing actuation instructions for the illumination of an image frame.

The pixels 301 as well as the control matrix 300 of the array 320 are formed on a substrate 304. The array includes an aperture layer 322, disposed on the substrate 304, which includes a set of apertures 324 for respective pixels 301 in the array 320. The apertures 324 are aligned with the shutter assemblies 302 in each pixel. In some implementations, the substrate 304 is made of a transparent material, such as glass or plastic. In some other implementations, the substrate 304 is made of an opaque material, but in which holes are etched to form the apertures 324.

The shutter assembly 302 together with the actuator 303 can be made bi-stable. That is, the shutters can exist in at least two equilibrium positions (e.g., open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 also can be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as spring 207 in the shutter-based light modulator 200 depicted in FIG. 2A, or the opposing force may be exerted by an opposing actuator, such as an "open" or "closed" actuator.

The light modulator array 320 is depicted as having a single MEMS light modulator per pixel. Other implementations are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

In some other implementations, the roller-based light modulator 220, the light tap 250, or the electrowetting-based light modulation array 270, as well as other MEMS-based light modulators, can be substituted for the shutter assembly 302 within the light modulator array 320.

FIGS. 4A and 4B show example views of a dual actuator shutter assembly 400. The dual actuator shutter assembly, as depicted in FIG. 4A, is in an open state. FIG. 4B shows the dual actuator shutter assembly 400 in a closed state. In contrast to the shutter assembly 200, the shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both of the actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with the shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of the shutter apertures 412 coincide with the centerlines of two of the aperture layer apertures 409. In FIG. 4B the shutter assembly 400 has been moved to the closed state and, as such, the shutter-open actuator 402 is in its relaxed position, the shutter-close actuator 404 has been actuated, and the light blocking portions of shutter 406 are now in position to block transmission of light through the apertures 409 (depicted as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In some other implementations, the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Figure 5:
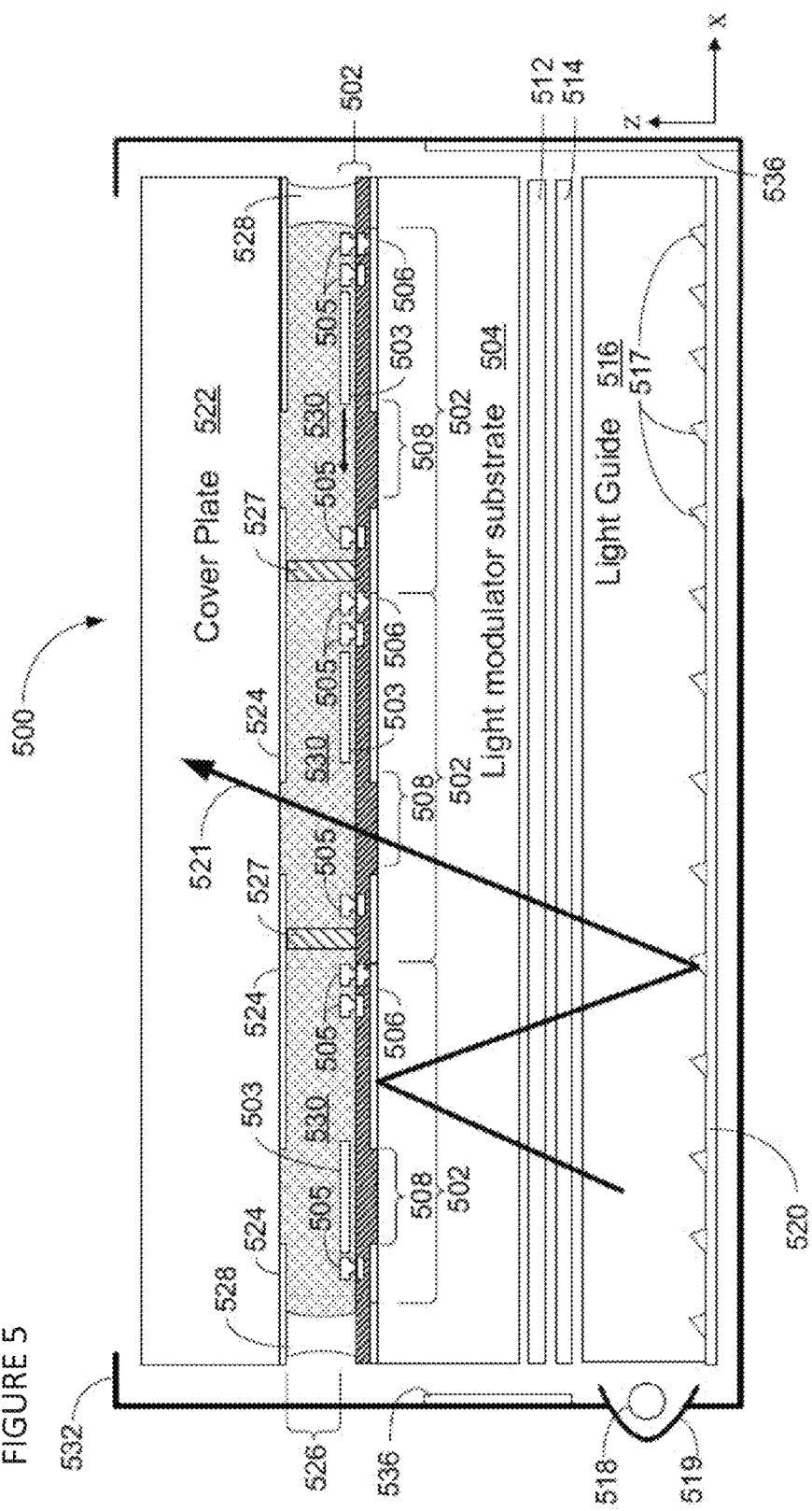
FIG. 5 shows an example cross sectional view of a display apparatus incorporating shutter-based light modulators.

FIG. 5 shows an example cross sectional view of a display apparatus 500 incorporating shutter-based light modulators (shutter assemblies) 502. Each shutter assembly incorporates a shutter 503 and an anchor 505. Not shown are the compliant beam actuators which, when connected between the anchors 505 and the shutters 503, help to suspend the shutters a short distance above the surface. The shutter assemblies 502 are disposed on a transparent substrate 504, preferably made of plastic or glass. A rear-facing reflective layer, reflective film 506, disposed on the substrate 504 defines a plurality of surface apertures 508 located beneath the closed positions of the shutters 503 of the shutter assemblies 502. The reflective film 506 reflects light not passing through the surface apertures 508 back towards the rear of the display apparatus 500. The reflective aperture layer 506 can be a fine-grained metal film without inclusions formed in thin film fashion by a number of vapor deposition techniques including sputtering, evaporation, ion plating, laser ablation, or chemical vapor deposition. In another implementation, the rear-facing reflective layer 506 can be formed from a mirror, such as a dielectric mirror. A dielectric mirror can be fabricated as a stack of dielectric thin films which alternate between materials of high and low refractive index. The vertical gap which separates the shutters 503 from the reflective film 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 depicted in FIG. 4B.

The display apparatus 500 includes an optional diffuser 512 and/or an optional brightness enhancing film 514 which separates the substrate 504 from a planar light guide 516. The light guide includes a transparent, i.e., glass or plastic material. The light guide 516 is illuminated by one or more light sources 518, forming a backlight. The light sources 518 can be, for example, and without limitation, incandescent lamps, fluorescent lamps, lasers or light emitting diodes (LEDs). A reflector 519 helps direct light from lamp 518 towards the light guide 516. A front-facing reflective film 520 is disposed behind the backlight 516, reflecting light towards the shutter assemblies 502. Light rays such as ray 521 from the backlight that do not pass through one of the shutter assemblies 502 will be returned to the backlight and reflected again from the film 520. In this fashion, light that fails to leave the display to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the lamps 518 towards the apertures 508 and hence toward the front of the display. The light re-directors can be molded into the plastic body of light guide 516 with shapes that can be alternately triangular, trapezoidal, or curved in cross section. The density of the prisms 517 generally increases with distance from the lamp 518.

In some implementations, the aperture layer 506 can be made of a light absorbing material, and in alternate implementations the surfaces of shutter 503 can be coated with either a light absorbing or a light reflecting material. In some other implementations, the aperture layer 506 can be deposited directly on the surface of the light guide 516. In some implementations, the aperture layer 506 need not be disposed on the same substrate as the shutters 503 and anchors 505 (such as in the MEMS-down configuration described below).

In some implementations, the light sources 518 can include lamps of different colors, for instance, the colors red, green and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps, or red, green, blue and yellow lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a fluid 530. The fluid 530 is engineered with viscosities preferably below about 10 centipoise and with relative dielectric constant preferably above about 2.0, and dielectric breakdown strengths above about $10^4$ V/cm. The fluid 530 also can serve as a lubricant. In some implementations, the fluid 530 is a hydrophobic liquid with a high surface wetting capability. In alternate implementations, the fluid 530 has a refractive index that is either greater than or less than that of the substrate 504.

Displays that incorporate mechanical light modulators can include hundreds, thousands, or in some cases, millions of moving elements. In some devices, every movement of an element provides an opportunity for static friction to disable one or more of the elements. This movement is facilitated by immersing all the parts in a fluid (also referred to as fluid) and sealing the fluid (e.g., with an adhesive) within a fluid space or gap in a MEMS display cell. The fluid is usually one with a low coefficient of friction, low viscosity, and minimal degradation effects over the long term. When the MEMS-based display assembly includes a liquid for the fluid 530, the liquid at least partially surrounds some of the moving parts of the MEMS-based light modulator. In order to reduce the actuation voltages, the liquid has a viscosity preferably below 70 centipoise, more preferably below 10 centipoise. Liquids with viscosities below 70 centipoise can include materials with low molecular weights: below 4000 grams/mole, or in some cases below 400 grams/mole. Suitable fluids 530 include, without limitation, de-ionized water, methanol, ethanol and other alcohols, paraffins, olefins, ethers, silicone oils, fluorinated silicone oils, or other natural or synthetic solvents or lubricants. Useful fluids can be polydimethylsiloxanes (PDMS), such as hexamethyldisiloxane and octamethyltrisiloxane, or alkyl methyl siloxanes such as hexylpentamethyldisiloxane. Useful fluids can be alkanes, such as octane or decane. Useful fluids can be nitroalkanes, such as nitromethane. Useful fluids can be aromatic compounds, such as toluene or diethylbenzene. Useful fluids can be ketones, such as butanone or methyl isobutyl ketone. Useful fluids can be chlorocarbons, such as chlorobenzene. Useful fluids can be chlorofluorocarbons, such as dichlorofluoroethane or chlorotrifluoroethylene. And other fluids considered for these display assemblies include butyl acetate, dimethylformamide. Still other useful fluids for these displays include hydro fluoro ethers, perfluoropolyethers, hydro fluoro poly ethers, pentanol, butanol. Example suitable hydro fluoro ethers include ethyl nonafluorobutyl ether and 2-trifluoromethyl-3-ethoxydodecafluorohexane.

A sheet metal or molded plastic assembly bracket 532 holds the cover plate 522, the substrate 504, the backlight 516 and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of light guide 516 back into the light guide. Not depicted in FIG. 5 are electrical interconnects which provide control signals as well as power to the shutter assemblies 502 and the lamps 518.

In some other implementations, the roller-based light modulator 220, the light tap 250, or the electrowetting-based light modulation array 270, as depicted in FIGS. 2A-2D, as well as other MEMS-based light modulators, can be substituted for the shutter assemblies 502 within the display apparatus 500.

The display apparatus 500 is referred to as the MEMS-up configuration, and the MEMS based light modulators are formed on a front surface of substrate 504, i.e., the surface that faces toward the viewer. The shutter assemblies 502 are built directly on top of the reflective aperture layer 506. In an alternate implementation, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in display apparatus 500 and is oriented such that the MEMS-based light modulators are positioned on the rear surface of the top substrate, i.e., the surface that faces away from the viewer and toward the back light 516. The MEMS-based light modulators are thereby positioned directly opposite to and across a gap from the reflective aperture layer. The gap can be maintained by a series of spacer posts connecting the aperture plate and the substrate on which the MEMS modulators are formed. In some implementations, the spacers are disposed within or between each pixel in the array. The gap or distance that separates the MEMS light modulators from their corresponding apertures is preferably less than 10 microns, or a distance that is less than the overlap between shutters and apertures, such as overlap 416.

Figure 6:
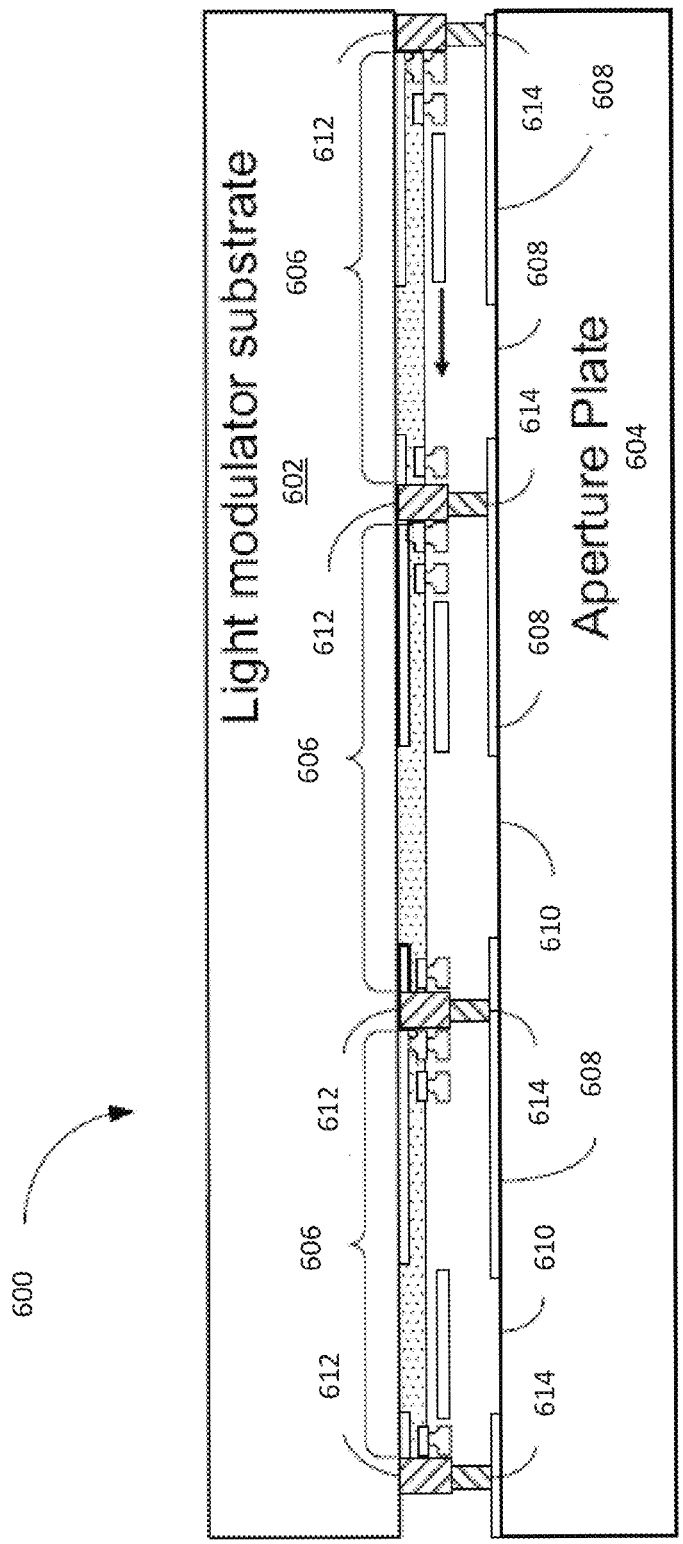
FIG. 6 shows a cross sectional view of a light modulator substrate and an aperture plate for use in a MEMS-down configuration of a display.

FIG. 6 shows a cross sectional view of a light modulator substrate and an aperture plate for use in a MEMS-down configuration of a display. The display assembly 600 includes a modulator substrate 602 and an aperture plate 604. The display assembly 600 also includes a set of shutter assemblies 606 and a reflective aperture layer 608. The reflective aperture layer 608 includes apertures 610. A predetermined gap or separation between the substrate 602 and 604 is maintained by the opposing set of spacers 612 and 614.

Figure 7:
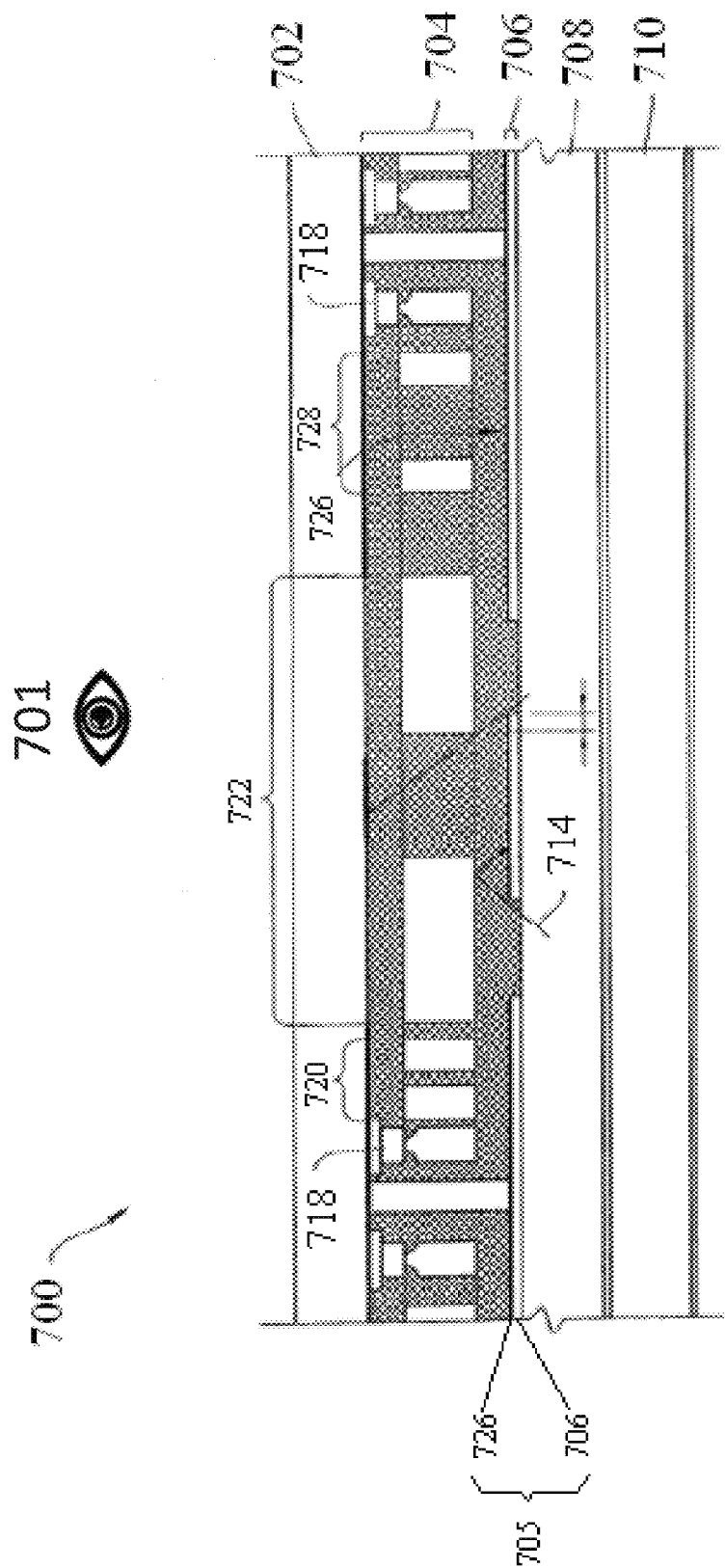
FIG. 7 shows an example display apparatus.

FIG. 7 shows an example display apparatus 700. The display apparatus 700 includes an front substrate 702, a shutter assembly 704, an aperture layer 705, a rear substrate 708, and a light guide 710.

The front substrate 702 may be made of a transparent material in some implementations, such as glass or plastic. Being transparent, light may pass through the front substrate 702 to the user 701, who views the display apparatus 700 looking towards the front substrate 702.

The shutter assembly 704 includes a shutter 722, opposing actuators 720 and 728, and anchors 718. The shutter 722 selectively obstructs light rays coming from the rear of the display apparatus 700, e.g., from the light guide 710. The opposing actuators 720 and 728 control the position of the shutter 722. The anchors 718 couple the shutter 722 to the front substrate 702 and support it over the rear substrate 708.

The aperture layer 705 includes: a rear-facing light reflecting layer 706 and a front-facing light absorbing layer 726. The front-facing light absorbing layer 726 is positioned on the front surface of the rear-facing light reflecting layer 706. The front-facing light absorbing layer 726 absorbs light originating from the ambient environment or a light source, for example, the light ray 714, which has been deflected from the rear side of the shutter 722.

Figure 8:
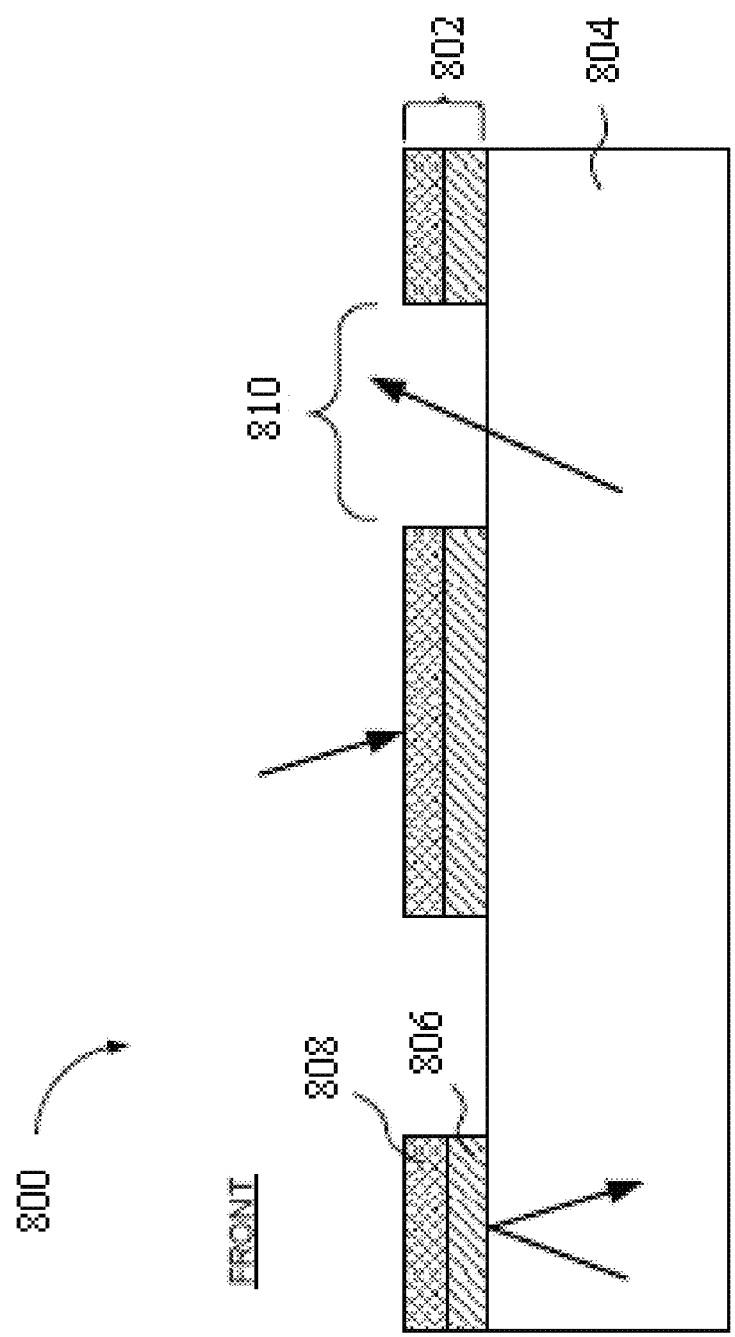
FIG. 8 shows an example aperture layer structure.

FIG. 8 shows an example aperture layer structure 800. The aperture layer structure 800 may be employed in a display apparatus, such as the display apparatus 500, 600 or 700 as depicted above in FIGS. 5, 6 and 7, respectively. The aperture layer structure 800 includes an aperture layer 802, which in turn includes a light reflecting layer 806 and a light absorbing layer 808. The aperture layer 802 is supported by a substrate 804, and includes apertures 810. In some implementations, the substrate 804 is a transparent substrate, such as glass or plastic. The aperture layer 802 is configured to block the passage of light from a display backlight at the rear of the display to the viewer in front of the display, except through the apertures 810 that are formed within both the light absorbing layer 808 and the light reflecting layer 806.

As indicated above, the aperture layer 802 includes a light reflecting layer 806 and a light absorbing layer 808. The light reflecting layer 806 is disposed over the substrate 804, and the light absorbing layer 808 is disposed over the light reflecting layer 806. The light reflecting layer 806 may include one or more layers, and the light absorbing layer 808 may also include one or more layers. The aperture layer 802 is configured to absorb light impinging on the front-facing surface of the aperture layer 802, and reflect light impinging on the rear-facing surface of the aperture layer 802. Furthermore, the apertures 810 are substantially aligned.

Each of the one or more layers that form the light reflecting layer 806 may be individually reflective, or the one or more layers may be collectively reflective. For example, the light reflecting layer 806 may be constructed from a stack of constructively interfering films. In some implementations, the light reflecting layer 806 may include a metal layer with enhanced reflectivity, such as silver (Ag) or aluminum (Al).

In some implementations, the light absorbing layer 808 may include light absorbing material suspended in a resin or a polymer. The light absorbing material can include aggregates, particles, nanoparticles, or powders including, but not limited to, aggregates of elemental carbon. In some other implementations, the resin can include a light absorbing black dye as part of its molecular structure. The size and density of the light absorbing material as well the thickness of the film determines the optical density of the light absorbing material. In some implementations, the thickness of the light absorbing layer 808 ranges from about 100 nm to about 2 microns. In some implementations, the light absorbing layer 808 is about 1 micron thick. In some implementations, the resin can be photosensitive. For example, the resin may be formed from a mixture of an alkali-soluble resin, a photopolymerizable monomer, a photoinitiator, and a solvent. Suitable light-absorbing photosensitive resins include, without limitation, resist CFPR BK-4611 provided by Tokyo Ohka Kogyo (TOK) Co., Ltd., headquartered in Kawasaki, Kanagawa, Japan, and resist EK-440 provided by Everlight Chemical Industrial Corporation, headquartered in Taipei, Taiwan. Other light absorbing materials or layer stacks may be employed to form light absorbing layer 808, as described below in detail.

Some metal alloys which can be effective at absorbing light, and thus are suitable for inclusion in the light absorbing layer 808 in some implementations. Such metals include, without limitation, molybdenum chromium (MoCr), molybdenum tungsten (MoW), molybdenum titanium (MoTi), molybdenum tantalum (MoTa), titanium tungsten (TiW), and titanium chromide (TiCr). Metal films formed from the above alloys or simple metals, such as nickel (Ni) and chromium (Cr) with rough surfaces can also be effective at absorbing light. Such films can be produced by sputter deposition in high gas pressures (sputtering atmospheres in excess of 20 mTorr). Rough metal films can also be formed by the liquid spray or plasma spray application of a dispersion of metal particles, following by a thermal sintering stage. A dielectric layer can then be added to prevent spalling or flaking of the metal particles.

Semiconductor materials, such as amorphous or polycrystalline silicon (Si), germanium (Ge), cadmium tellurium (CdTe), indium gallium arsenide (InGaAs), colloidal graphite (carbon) and alloys such as silicon germanium (SiGe) are also effective at absorbing light and thus are also suitable for use in the light absorbing layer 808. These materials can be deposited in films having thicknesses in excess of about 500 nm to substantially prevent any transmission of light through the thin film. Metal oxides or nitrides can also be effective at absorbing light, including without limitation copper oxide (CuO), nickel oxide (NiO), chromium oxide ($Cr_2O_3$), silver oxide (AgO), tin oxide (SnO), zinc oxide (ZnO), titanium oxide (TiO), tantalum pentoxide ($Ta_2O_5$), molybdenum oxide ($MoO_3$), chromium nitride (CrN), titanium nitride (TiN), or tantalum nitride (TaN). The absorption of these oxides or nitrides improves if the oxides are prepared or deposited in non-stoichiometric fashion, often by sputtering or evaporation, especially if the deposition process results in a deficit of oxygen in the lattice. As with semiconductors, metal oxides are deposited to thicknesses in excess of about 500 nm to substantially prevent transmission of light through the film.

A class of materials, called cermets, is also effective at absorbing light and can be incorporated into the light absorbing layer 808 in some implementations. Cermets are typically composites of small metal particles suspended in an oxide or nitride matrix. Examples include Cr particles in a $Cr_2O_3$ matrix or Cr particles in a silicon dioxide ($SiO_2$) matrix. Other metal particles suspended in the matrix can be nickel (Ni), titanium (Ti), gold (Au), silver (Ag), molybdenum (Mo), niobium (Nb), and carbon (C). Other matrix materials include titanium dioxide ($TiO_2$), tantalum pentoxide ($Ta_2O_5$), aluminum oxide ($Al_2O_3$) and silicon nitride ($Si_3N_4$).

It is also possible to create multi-layer absorbing structures using destructive interference of light between suitable thin film materials. Some implementations involve a partially reflecting layer of a dielectric such as an oxide or nitride along with a metal of suitable reflectivity. The oxide can be a metal oxide such as chromium dioxide ($CrO_2$), $TiO_2$, $Al_2O_3$ or $SiO_2$ or a nitride such as $Si_3N_4$. Suitable metals include Cr, Mo, Al, Ta, Ti. In some other implementations, the metal layer is deposited first, followed by deposition of the metal oxide. The absorptivity of the bi-layer stack can be improved if the thickness of the oxide layer is chosen to be substantially equal to approximately one quarter of 0.55 microns divided by the refractive index of the oxide layer. These multi-layer structures are also suitable alternatives for inclusion in the light absorbing layer 808.

In some implementations, a metal layer may be deposited on top of the reflective layer 806, followed by a suitable oxide layer of calculated thickness. Then, a thin layer of metal may be deposited on top of the oxide such that the thin metal is only partially reflecting, the thin layer of metal having a thickness less than about 0.02 microns. Partial reflection from the upper metal layer will destructively interfere with the reflection from the lower metal layer and thereby produce an absorptive effect. As discussed above, absorption can be increased if the thickness of the oxide layer is chosen to be substantially equal to approximately one quarter of 0.55 microns divided by the refractive index of the oxide layer.

Figure 9:
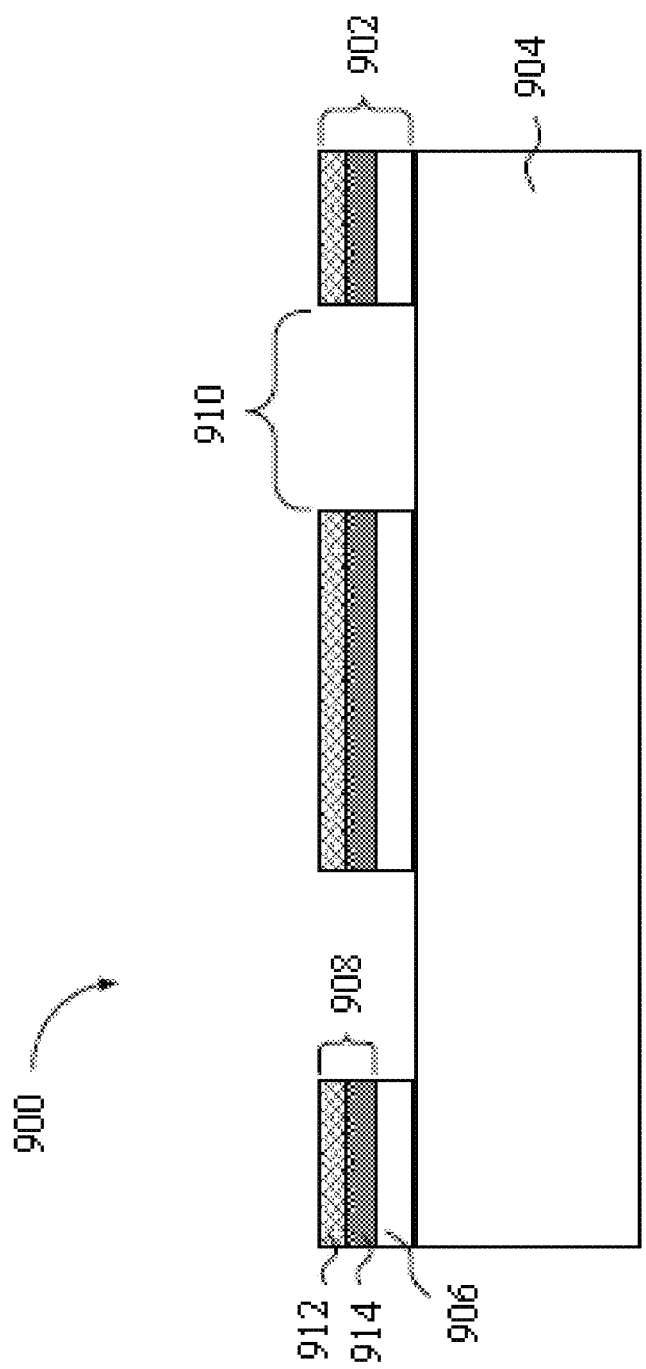
FIG. 9 shows an example aperture layer structure.

FIG. 9 shows an example aperture layer structure 900. The aperture layer structure 900 can be incorporated into the display apparatus 500, 600 or 700 as depicted above in FIGS. 5, 6, and 7, respectively. The aperture layer structure 900 includes an aperture layer 902 on a substrate 904, where the aperture layer 902 defines apertures 910. The aperture layer 902 includes a light absorbing layer 908, provided over a light reflecting layer 906. In some implementations, the light absorbing layer 908 may include two or more light absorbing layers 912 and 914. In some implementations, the substrate 904 may be a transparent substrate, made of glass or plastic. In some implementations, the light absorbing layer 912 may be formed of light absorbing material suspended in a resin, and the light absorbing layer 914 may be formed from a different composition than the light absorbing layer 912. The light absorbing layer 912 and/or the light absorbing layer 914 can include one or more of the light absorbing materials previously described.

The aperture layer 902 is configured to block the passage of light from the display backlight at the rear of the display to a viewer in front of the display except through the apertures 910 that are formed within both the light absorbing layer 908 and the light reflecting layer 906. Furthermore, the apertures 910 are substantially aligned, avoiding the problems of undesired reflection.

In some implementations, the light absorbing layer 914 can include a metal layer that effectively absorbs light such as a metal having a reflectivity of less than about 50%. Some metals that can be effective at absorbing light include, without limitation, MoW, MoCr, MoTa, MoTi, Ti, TiW, and TiCr. In some implementations, the light absorbing layer 914 includes a dielectric layer and a metal layer, as described above to create a multi-layer absorbing structure using destructive interference of light between suitable thin film materials.

Figure 10:
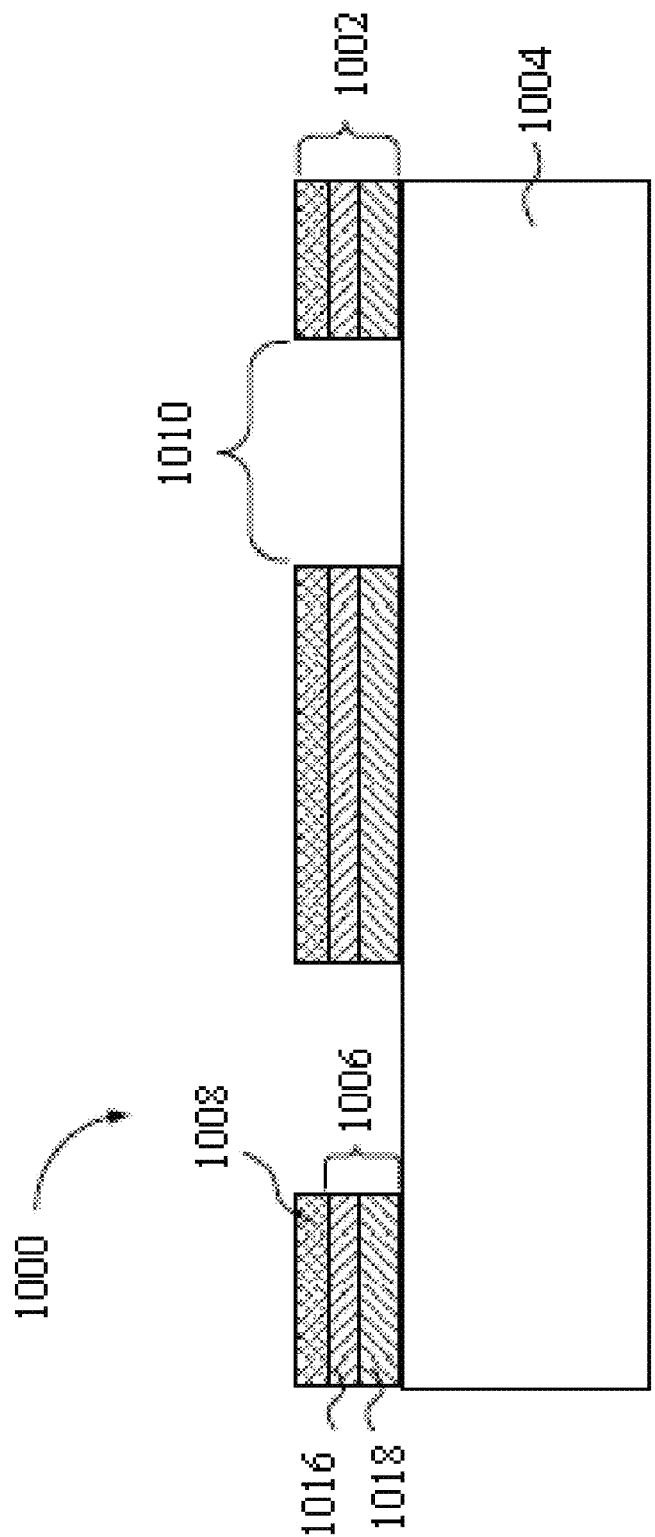
FIG. 10 shows an example aperture layer structure.

FIG. 10 shows an example aperture layer structure 1000. The aperture layer structure 1000 may be employed in a display apparatus, such as 500, 600 or 700 depicted above in FIGS. 5, 6 and 7, respectively. The aperture layer structure 1000 includes an aperture layer 1002 on a substrate 1004, where the aperture layer 1002 defines apertures 1010. In some implementations, the aperture layer 1002 includes a light reflecting layer 1006, which in turn includes two or more light reflecting layers 1016 and 1018. In some implementations, the substrate 1004 is a transparent substrate, such as glass or plastic. A light absorbing layer 1008 is provided over the light reflecting layer 1006. In some implementations, one of the light reflecting layers 1016 and 1018 is a metal layer with enhanced reflectivity, such as Ag or Al, and the other of the light reflecting layers 1016 and 1018 is a dielectric stack mirror formed of alternating layers of materials having different refractive indices. The aperture layer 1002 is configured to block the passage of light from the display backlight at the rear of the display to the viewer at the front of the display except through the apertures 1010 formed through both the light absorbing layer 1008 and the light reflecting layer 1006.

Figure 11:
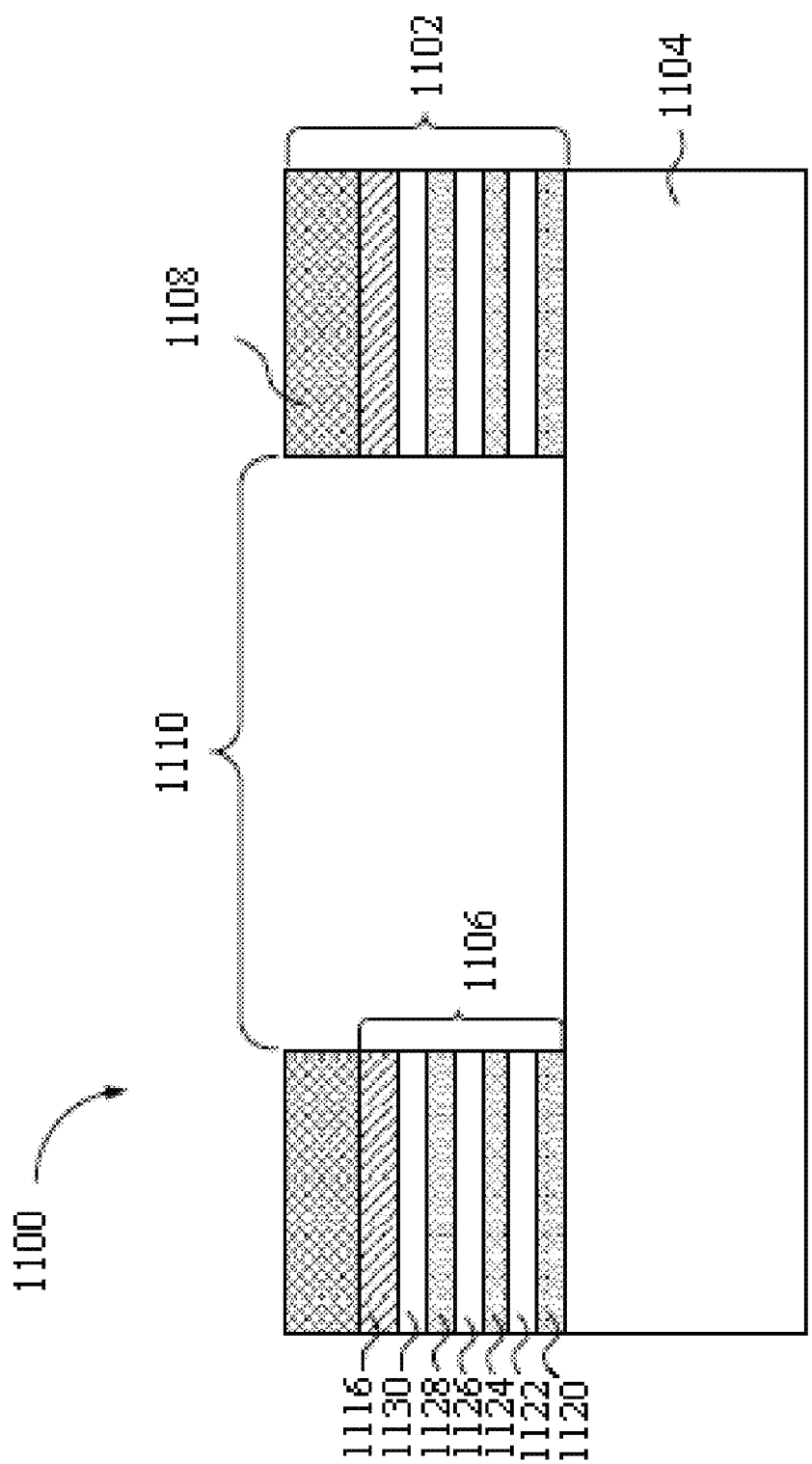
FIG. 11 shows an example aperture layer structure.

FIG. 11 shows an example aperture layer structure 1100. The aperture layer structure 1100 may be employed in a display apparatus, such as 500, 600 or 700 depicted above in FIGS. 5, 6 and 7, respectively. The aperture layer structure 1100 includes a substrate 1104, an aperture layer 1102, which in turn includes a dielectrically enhanced metal mirror 1106, and a light absorbing layer 1108. The dielectrically enhanced metal mirror 1106 and the light absorbing layer 1108 have been patterned to form apertures 1110. The aperture layer 1102 is configured to block the passage of light from a display backlight at the rear of the display to a viewer at the front of the display, except through the apertures 1110 that are formed through both the light absorbing layer 1108 and the dielectrically enhanced metal mirror 1106.

In some implementations, the dielectrically enhanced metal mirror 1106 is formed from a metal layer 1116 and a multiple layer stack of dielectric material layers having at least two different refractive indices (e.g., layers 1120, 1122, 1124, 1126, 1128, 1130). In some implementations, the dielectric layers in the multiple layer stack of dielectric material layers have alternating refractive indices. In one implementation, the dielectrically enhanced metal mirror 1106 is formed of dielectric layers 1120, 1124, and 1128 of a first refractive index (e.g., $TiO_2$ and/or $Si_3N_4$) and dielectric layers 1122, 1126, and 1130 of a second refractive index (e.g., $SiO_2$). The first refractive index can be greater than about 2.0. Dielectrics having refractive indices in this range include $TiO_2$ or $Si_3N_4$, which have refractive indices of about 2.4 and about 2.0, respectively. The second refractive index can be less than about 1.8. Dielectrics having refractive indices in this range include $SiO_2$, which has a refractive index of about 1.46. Layer thicknesses that provide enhanced reflectivity are then selected based on the refractive indices of the respective layers, as can be determined using light interference principles.

In some implementations, the dielectrically enhanced metal mirror is a 7-layer stack of materials including, in order from the substrate up, a thin film of $Si_3N_4$ having a thickness of about 64 nm (layer 1120), a thin film of $SiO_2$ having a thickness of about 88 nm (layer 1122), another thin film of $Si_3N_4$ having a thickness of about 64 nm (layer 1124), another thin film of $SiO_2$ having a thickness of about 88 nm (layer 1126), another thin film of $Si_3N_4$ having a thickness of about 64 nm (layer 1128), another thin film of $SiO_2$ having a thickness of about 88 nm (layer 1130), and a thin film of a metal (layer 1116), such as aluminum or silver. In some dielectrically enhanced metal mirrors, the metal layer has a thickness greater than about 50 nm and less than about 2 microns. In some implementations, the metal layer has a thickness of about 200 nm.

In some implementations, the dielectrically enhanced metal mirror 1106 is a 5-layer stack of materials including, in order from the substrate up, a thin film of $TiO_2$ having a thickness of about 50 nm, a thin film of SiO$_2$ having a thickness of about 88 nm, another thin film of TiO$_2$ having a thickness of about 50 nm, another thin film of SiO$_2$ having a thickness of about 88 nm, and a thin film of metal, such as Al or Ag. In some dielectrically enhanced metal mirrors, the metal layer has a thickness greater than about 50 nm and less than about 2 microns. In some implementations, the metal layer has a thickness of about 200 nm. It should also be appreciated from the above examples, that any number of pairs of dielectric materials layers may be utilized to form a dielectrically enhanced metal mirror.

In some implementations, the light absorbing layer 1108 is provided on top of the dielectrically enhanced metal mirror 1106. In some implementations, the light absorbing layer 1108 includes light absorbing material suspended in a resin. The light absorbing material can include light absorbing aggregates, including but not limited to aggregates of elemental carbon. The size and density of the aggregates as well the thickness of the film determines the optical density of the matrix. In some implementations, the thickness of the light absorbing layer ranges from about 100 nm to about 2 microns. In some implementations, the light absorbing layer 1108 is about 1 micron thick. In some implementations, the resin can be photosensitive. Example photosensitive resins include mixtures of an alkali-soluble resin, a photopolymerizable monomer, a photoinitiator, and a solvent. In some implementations, a light absorbing material including a resin or a polymer may be spin coated. Other light absorbing materials or layer stacks may alternatively, or additionally, be employed to form light absorbing layer 1108, as described in detail in relation to the light absorbing layer 808 of the aperture layer structure 800 depicted in FIG. 8.

In some implementations, apertures, such as apertures 1110, 1010, 910, or 810 as depicted in FIGS. 11, 10, 9 and 8, respectively, can be patterned using processes known to persons of ordinary skill in the art, such as by photolithography and etch or by photolithography and lift-off.

In the etch process, a layer of photoresist may be provided (e.g., via spin coating) on the top of the dielectrically enhanced metal mirror 1106 and then exposed to ultraviolet (UV) light through a mask. Alternatively, one or more layers of the thin film stack can serve as the photoresist. For example, a photosensitive resin including light absorbing material can be used as a photoresist. After developing the aperture pattern in the exposed layer of photoresist, the stack can be etched in the region of apertures down to the substrate. Such etching may be accomplished by immersion in wet chemicals, by a dry plasma or ion beam etch, or any combination of the above.

In the lift-off process, the layer of photoresist may be disposed on the substrate before deposition of the thin film stack. The resist is then developed into a pattern that is a reverse of the etch mask pattern. The thin film stack is then deposited over the top of the photoresist, such that the thin film stack makes contact to the substrate everywhere except in the regions of the apertures. After deposition of the thin film stack is complete, the substrate is dipped into a bath of chemicals that dissolves or lifts-off the photoresist as well as any thin film materials that were deposited on top of the photoresist.

Figure 12:
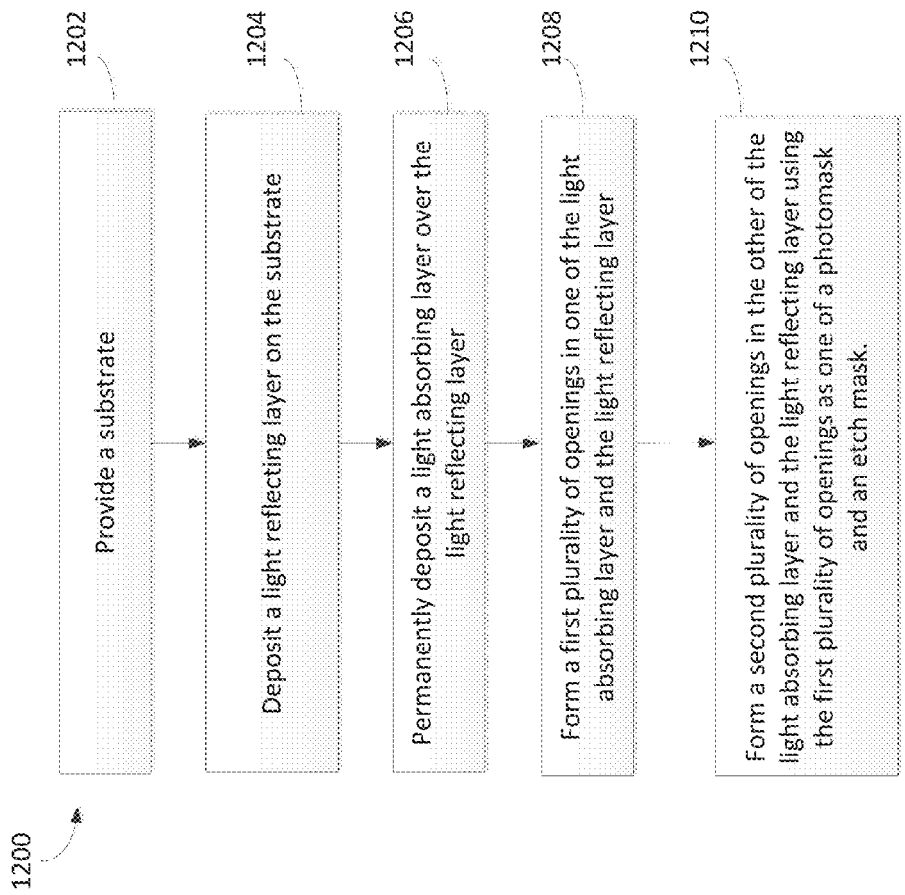
FIG. 12 shows a flow diagram of an example process for forming a self-aligned aperture layer structure.

FIG. 12 shows a flow diagram of an example process 1200 to form a self-aligned aperture layer structure. The aperture layer formation process 1200 uses the topmost layer of an aperture layer as a mask for the subsequent removal of underlying layers. Due to this self-aligned nature of the aperture layer formation process 1200, the resulting apertures in the various layers of the aperture layer are substantially aligned. The aperture layer formation process 1200 includes providing a substrate (block 1202). Then, a light reflecting layer is deposited on top of the substrate (block 1204). Afterwards, a light absorbing layer is permanently deposited on top of the light reflecting layer (block 1206). A first set of openings is formed in one of the light absorbing layer and the light reflecting layer (block 1208). Next, a second set of openings are formed in the other of the light absorbing layer and the light reflecting layer using the first plurality of openings as one of a photomask and an etch mask (block 1210). Each of these stages are discussed further below in relation to FIGS. 13A-13C.

FIGS. 13A-13C show stages of the process 1200 depicted in FIG. 12 for forming a self-aligned aperture layer structure 1300. Referring now to FIG. 12 and FIGS. 13A-13C, FIG. 13A shows a provided substrate 1304 (block 1202), a light reflecting layer 1306 deposited on top of the substrate 1304 (block 1204), and a light absorbing layer 1308 permanently deposited on top of the light reflecting layer 1306 (block 1206).

In some implementations, the substrate 1304 may be transparent and be made of glass or plastic. In some implementations, the light reflecting layer 1306 can include a metal layer having enhanced reflectivity such as Al, Ag, a dielectric stack mirror to enhance the layer's reflectivity, a standalone dielectrically enhanced metal mirror, or any combination of the above. The light absorbing layer 1308 may be a photoresist, a photosensitive or photo-patternable material, or a light absorbing material suspended in a photosensitive resin. In some implementations, the light reflecting layer 1306 and the light absorbing layer 1308 may be deposited using sputtering, chemical vapor deposition (CVD) or physical vapor deposition (PVD).

As shown in FIG. 13B, a first set of openings is formed in the light absorbing layer 1308 (block 1208). The light absorbing layer 1308 is exposed to ultraviolet (UV) light 1312 through a mask. The light absorbing layer 1308 is then treated with a developer, thereby forming the first set of openings 1314. The openings 1314 uncover portions of the light reflecting layer 1306 in regions where apertures 1310 are eventually to be formed.

As shown in FIG. 13C, a second set of openings is formed in the light reflecting layer 1306 using the first set of openings as an etch mask to define a set of apertures 1310 (block 1210). Portions of the light reflecting layer 1306 exposed through the openings 1314 are removed to form a second set of openings. Removal of the uncovered portions of the light reflecting layer 1306, down to the substrate 1304 in some implementations, may be achieved by using an etching process. Such etching may be accomplished by immersion in wet chemicals, a dry plasma or ion beam etch, or any combination of the above. The remaining portions of the light absorbing layer 1308 serve as a mask, protecting underlying portions of the light reflecting layer 1306. As a result, the second set of openings are self-aligned with the first set of openings. Due to the self-aligned nature of the process, the alignment of the light absorbing layer 1308 and the light reflection layer 1306 can be substantially aligned. Also the use of a separate mask which is used just for etching and then is removed can be eliminated.

In some implementations, the light absorbing layer 1308 need not be photo-sensitive. Instead, a photoresist may be applied, and a photo-exposure process may be used to create a photoresist mask for etching the light absorbing layer 1308. In some implementations, a hard mask is deposited over the light absorbing layer 1308. The hard mask can be formed of a relatively thermally stable and hard material, such as a semiconductor like Si or SiGe, a dielectric such as $SiO_2$, $Si_3N_4$, silicon oxynitride ($Si_2N_2O$), and/or a metal such as Al. The hard mask can be patterned using a photoresist and etch process. The hard mask can then provide strong etch-resistant protection during the etch of both the light absorbing layer 1308 and the light reflecting layer 1306.

As is depicted in FIGS. 13A-13C, in some implementations, openings in the light absorbing layer 1308 may be formed prior to openings in the light reflecting layer 1306. As previously described, this may be achieved by patterning, such as through UV exposure and development, a photosensitive light absorbing layer 1308 disposed on the light reflecting layer 1306 so as to form openings in the photosensitive light absorbing layer 1308. Then, the patterned light absorbing layer 1308 is used as a mask for the removal, via etching, of the light reflecting layer 1306 by using the openings 1314 in the light absorbing layer 1308. Alternatively, this may be achieved by the patterning of a mask layer such as a photoresist or hard mask disposed on the light absorbing layer 1308 so as to form openings in the mask layer, and then using the mask layer as a mask for the removal, via etching, of both the light absorbing layer 1308 and the light reflecting layer 1306 through the openings of the mask layer.

Figure 14:
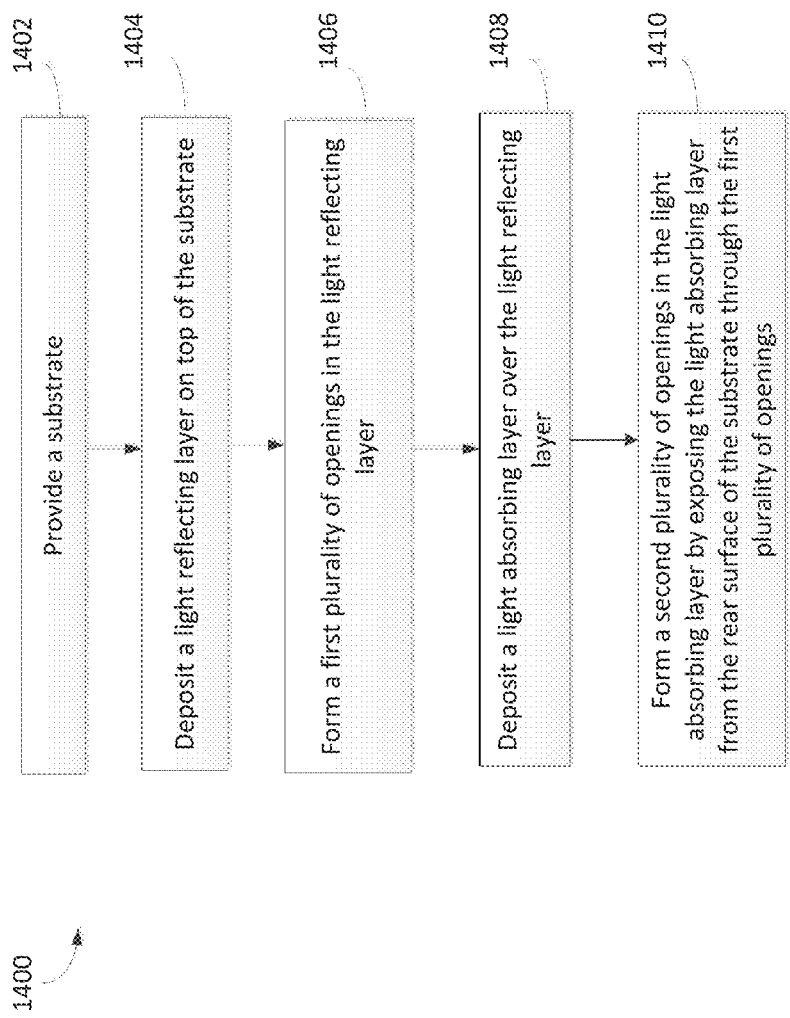
FIG. 14 shows a flow diagram of an example process for forming an aperture layer structure.

FIG. 14 shows a flow diagram of an example process 1400 for forming an aperture layer structure. The aperture layer formation process 1400 uses the bottom-most layer of an aperture layer, in this case a light reflecting layer, as a mask for the subsequent removal of overlying layers. Due to this self-aligned nature of the aperture layer formation process 1400, substantial alignment of the light absorbing layer and the light reflecting layer is readily achieved. The aperture layer formation process 1400 includes first providing a substrate (block 1402). Then, a light reflecting layer is deposited on top of the substrate (block 1404). Afterwards, a first set of openings is formed in the light reflecting layer (block 1406). Then, a light absorbing layer is deposited over the light reflecting layer (block 1408). Next, a second set of openings is formed in the light absorbing layer by exposing the light absorbing layer from the rear surface of the substrate through the first set of openings (block 1410). Each of these stages are discussed for the below in relation to FIGS. 15A-15D.

FIGS. 15A-15D show stages of the process 1400 depicted in FIG. 14 for forming a self-aligned aperture layer structure 1500. Referring now to FIG. 14 and FIGS. 15A-15D, FIG. 15A shows a provided substrate (block 1402), a light reflecting layer 1506 deposited on top of the substrate 1504 (block 1404), and a photoresist layer 1516 deposited on top of the light reflecting layer 1506 (block 1406). In some implementations, the substrate may be transparent and made of glass or plastic. In some implementations, the light reflecting layer can include a metal layer having enhanced reflectivity such as Al, Ag, a dielectric stack mirror to enhance the layer's reflectivity, a standalone dielectrically enhanced metal mirror, or any combination of the above. In some implementations, the light reflecting layer may be deposited using sputtering, chemical vapor deposition (CVD) or physical vapor deposition (PVD). In some implementations, the photoresist layer may be deposited by using spin coating.

Figure 15A:
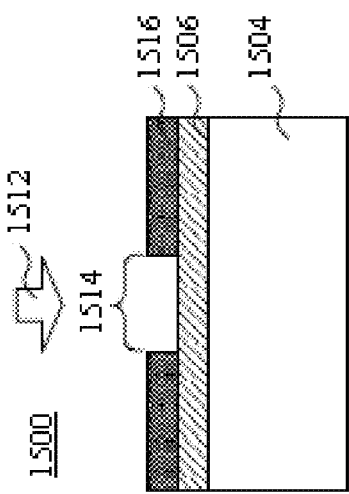
FIGS. 15A-15D show stages of the process depicted in FIG. 14 for forming a self-aligned aperture layer structure.
Figure 15B:
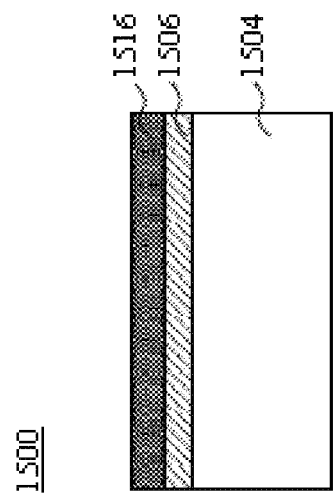

As shown in FIG. 15B, the photoresist layer 1516 is exposed to UV light 1512 through a mask, to form a first set of photoresist openings 1514 after development of the photoresist layer 1516 (block 1406). The first set of photoresist openings 1514 uncover portions of the light reflecting layer 1506 in regions where apertures 1510 eventually are to be formed.

Figure 15C:
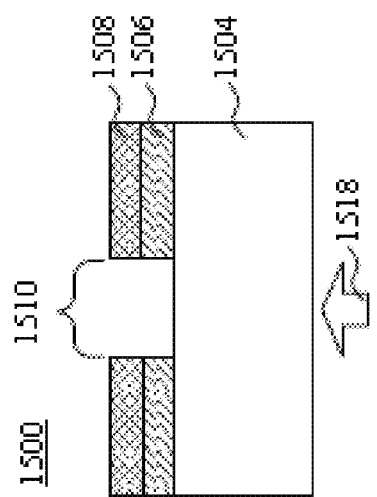

As shown in FIG. 15C, a first set of openings 1515 is formed in the light reflecting layer 1506 by etching portions of the light reflecting layer 1506 uncovered through the first set of photoresist openings 1514 (block 1406). Removal of the portions of the light reflecting layer 1506 uncovered by the first set of photoresist openings 1514 down to the substrate 1504 may be achieved by using an etching process. Such etching may be accomplished by immersion in wet chemicals, by a dry plasma or ion beam etch, or any combination of the above.

Then, the photoresist layer 1516 is stripped. The photoresist layer 1516 is stripped or removed by using, for example, a resist stripping solution and/or an oxygen-containing plasma.

In some implementations, a hard mask is deposited over the light absorbing layer 1508 and can be patterned using a photoresist and etch process, and then can provide a strong etch-resistant protection during the etch of both the light absorbing layer 1508 and the light reflecting layer 1506. In some implementations, openings in the light reflecting layer 1506 may be formed prior to openings in the light absorbing layer 1508.

As further shown in FIG. 15C, a light absorbing layer 1508 is deposited over the patterned light reflecting layer 1506 (block 1408). The light absorbing layer 1508 may be photosensitive or photo-patternable. For example, the light absorbing layer 1508 can include light absorbing material suspended in a photosensitive resin. In some implementations, the light absorbing layer 1508 is not photosensitive. In some implementations, the light absorbing layer may be deposited using sputtering, CVD or PVD.

Figure 15D:
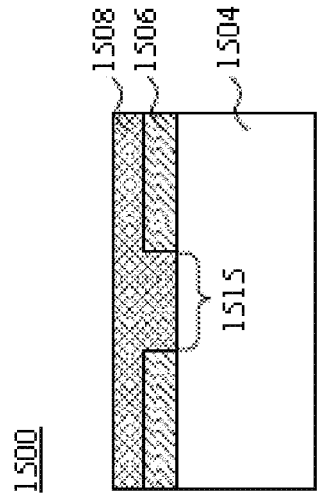

As shown in FIG. 15D, the light absorbing layer 1508 is exposed to UV light 1518 through the rear surface of the substrate 1504 through the first set of openings 1515 formed in the light reflecting layer 1506. Effectively, the light reflecting layer 1506 serves as a mask. A second set of openings is formed in the light absorbing layer 1508 by developing the light absorbing layer 1508 (block 1410). The first set of openings 1515 and the second set of openings together make up a set of apertures 1510 that are substantially aligned.

Figure 16:
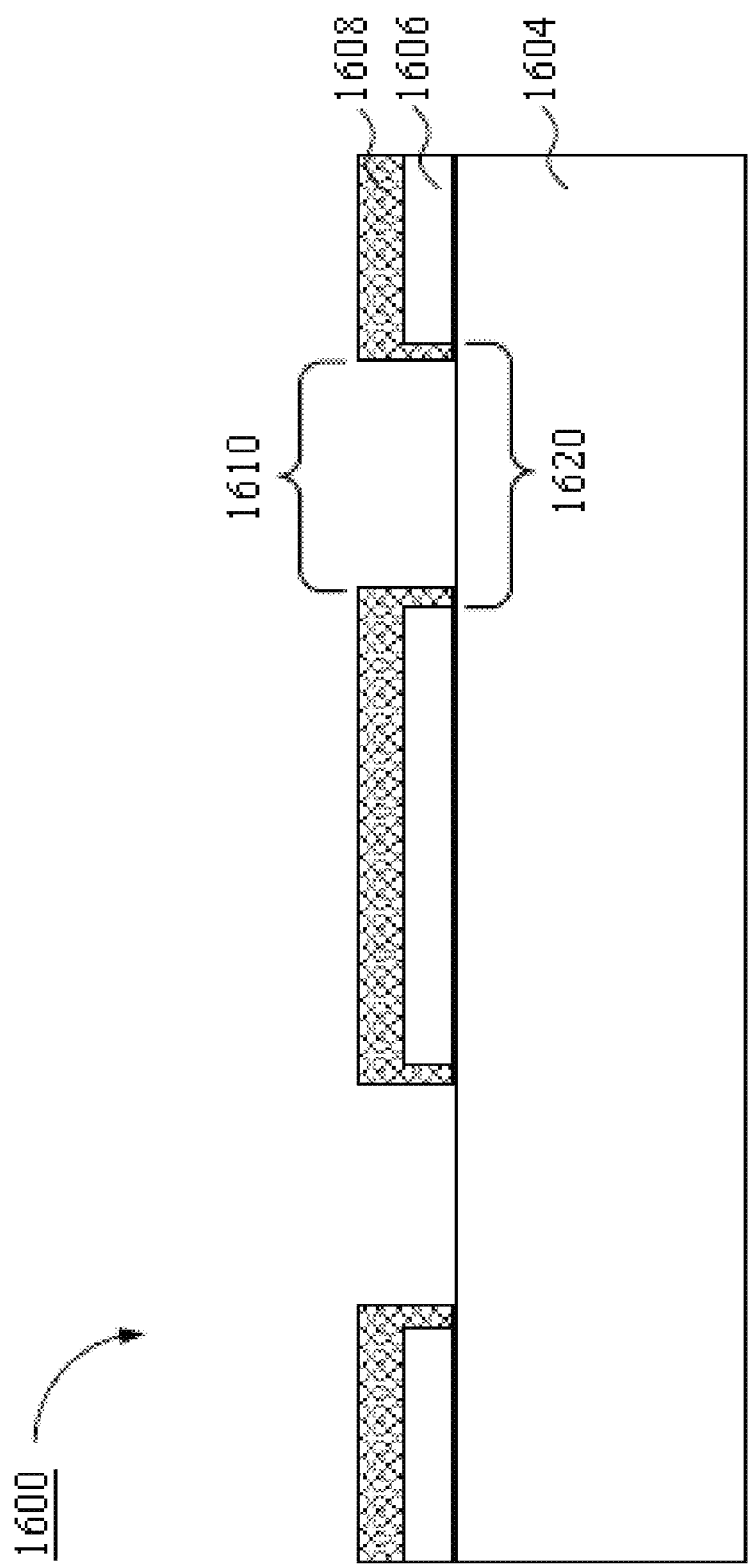
FIG. 16 shows an example aperture layer structure.

FIG. 16 shows an example aperture layer structure 1600. The aperture layer structure 1600 may be employed in a display apparatus, such as the display apparatus 500, 600 or 700 depicted in FIGS. 5, 6 and 7, respectively. The aperture layer structure 1600 includes a substrate 1604, a light reflecting layer 1606, a light absorbing layer 1608, and apertures 1610. In contrast to the aperture layer structures described above, the apertures 1610 are not self-aligned. That is, neither set of openings in either layer of the aperture layer (i.e., neither the light absorbing layer 1608 nor the light reflecting layer 1606) is formed using openings in the other layer as an etch mask. Instead, the apertures 1610 are formed such that the light absorbing layer 1608 (or, if the light absorbing layer 1608 itself includes multiple layers, at least one layer of the light absorbing layer 1608) coats the side walls of openings 1620 formed in the light reflecting layer 1606. This coating prevents reflection and refraction of light off of the edges of the openings in the light reflecting layer 1606.

FIG. 17 shows a flow diagram of an example process 1700 for forming an aperture layer structure 1600. The aperture layer structure 1600 is depicted in FIG. 16. The aperture layer formation process 1700 includes first providing a substrate surface (block 1702). Then, a light reflecting layer is deposited on top of the substrate (block 1704). Afterwards, a first set of openings is formed in the light reflecting layer (block 1706). Then, a light absorbing layer is deposited over the light reflecting layer (block 1708). Next, a second set of openings is formed in the light absorbing layer to define a set of apertures, wherein portions of the light absorbing layer remain on the sidewalls of the first plurality of openings (block 1710). Each of these stages are discussed for the below in relation to FIGS. 18A-18F.

FIGS. 18A-18F show stages of the process 1700 depicted in FIG. 17 for forming an aperture layer structure 1800. Referring now to FIG. 17 and FIGS. 18A-18F, FIG. 18A shows a provided substrate 1804 (block 1702), a light reflecting layer 1806 deposited on top of the substrate 1804 (block 1704), and a first photoresist layer 1816 deposited on top of the light reflecting layer 1806 (block 1706). In some implementations, the substrate may be transparent and made of glass or plastic. In some implementations, the light reflecting layer can include a metal layer having enhanced reflectivity such as Al, Ag, a dielectric stack mirror to enhance the layer's reflectivity, a standalone dielectrically enhanced metal mirror, or any combination of the above. In some implementations, the light reflecting layer may be deposited using sputtering, CVD or PVD. In some implementations, the photoresist layer may be deposited by using spin coating.

As shown in FIG. 18B, a first set of photoresist openings 1814 is formed in the first photoresist layer 1816 (block 1706). This can be done by directing UV light 1812 through a mask onto the first photoresist layer 1816, and developing the exposed portions of the first photoresist layer 1816 to form the first set of photoresist openings 1814. The first set of photoresist openings 1814 uncover portions of the light reflecting layer 1806 in particular regions.

A first set of openings 1820 is then formed in the light reflecting layer 1806 by etching portions of the light reflecting layer 1806 uncovered by the first set of photoresist openings 1814 (block 1710). Removal of the portions of the light reflecting layer 1806 may be achieved with an etching process, such as, for example, immersion in wet chemicals, a dry plasma or ion beam etch. Afterwards, the first photoresist layer 1816 is stripped. The first photoresist layer 1816 may be removed using a resist stripping solution or an oxygen-containing plasma.

In some implementations, a hard mask is deposited over the light absorbing layer 1808 and can be patterned using a photoresist and etch process, and then can provide a strong etch-resistant protection during the etch of both the light absorbing layer 1808 and the light reflecting layer 1806. In some implementations, photoresist layers may be removed by using, for example, a resist stripping solution and/or an oxygen containing plasma. In some implementations, to provide proper alignment of the corresponding openings in each layer, an alignment process may be utilized whereby the mask used to expose any photoresist layer is aligned to fiducials in the light reflecting layer. The fiducials may include any suitable reference markings in the light reflecting layer.

A light absorbing layer 1508 is then deposited on top of the light reflecting layer 1506 (block 1708). In some implementations, the light absorbing layer 1508 can be or include one or more of the light absorbing layers described above with respect to the light absorbing layer 808 depicted in FIG. 8, for example. In some implementations, the light absorbing layer is a light absorbing material suspended in a resin, or a photoresist or photo-patternable material. In some implementations, the light absorbing layer is not photosensitive. In some implementations, the light absorbing layer may be deposited by CVD or PVD.

As shown in FIG. 18D, a second photoresist layer 1822 is then deposited over light absorbing layer 1808 (block 1710). In some implementations, the second photoresist layer 1822 may be deposited with spin coating.

Then, as shown in FIG. 18E, a second set of photoresist openings 1824 is formed in the second photoresist layer 1822. This can be done by exposing the second photoresist layer 1822 to UV light 1818 through a mask, and developing the exposed second photoresist layer 1822 to form the second set of photoresist openings 1824. The second set of photoresist openings 1824 uncover portions of the light absorbing layer 1808 in particular regions, such that the second set of photoresist openings 1824 reside over the first set of openings 1820 in the light reflecting layer 1806. To provide proper alignment of the corresponding set of openings in each layer, an alignment process may be utilized. For instance, in some implementations, the mask used to expose the second photoresist layer 1822 is aligned to fiducials in the light reflecting layer 1806. The fiducials may include any suitable reference markings in the light reflecting layer 1806. The second set of photoresist openings 1824 may have a width smaller than the first set of openings 1820 in the light reflecting layer 1806.

As shown in FIG. 18F, a second set of openings is then formed in the portions of the light absorbing layer 1808 uncovered by the second set of photoresist openings 1824 so as to define apertures 1810 (block 1710). The width of the second set of openings is also smaller than the width of the first set of openings 1820 and at least one layer of the light absorbing layer 1808 coats the side walls of the apertures 1810. Removal of the uncovered portions of the light absorbing layer 1808, in some implementations down to the substrate 1804, may be achieved using an etching process. Such etching may be accomplished by immersion in wet chemicals, by a dry plasma or ion beam etch, or any combination of the above. The second photoresist layer 1822 is then removed, by using, for example, a resist stripping solution and/or an oxygen containing plasma. Since the width of the second set of openings (which have substantially the same width as the second set of photoresist openings 1824) is smaller than the width of the first set of openings 1820, after the etch is complete, portions of the light absorbing layer 1806 remain on the sidewalls of the first set of openings 1820, encapsulating the reflective material of the light reflecting layer 1806. This helps to eliminate any reflection or refraction of light off the sidewalls of the light reflecting layer 1806, which can contribute to undesired light emission when a light modulator is in a closed state.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. a general purpose processor may be a microprocessor, or, any conventional processor, controller, microcontroller, or state machine. a processor also may be implemented as a combination of computing devices, e.g., a combination of a DSP and a microprocessor, a set of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display comprising:
   an aperture layer including a light absorbing layer disposed over a light reflecting layer, each layer having a plurality of apertures defined therein, wherein the light absorbing layer includes light absorbing material suspended in a photosensitive resin; and
   a plurality of light modulators for modulating light passing through the apertures defined in the aperture layer,
   wherein the light absorbing layer comprises at least two light absorbing layers such that one of the two light absorbing layers is deposited directly on top of the other of the two light absorbing layers, and
   wherein at least one of the two light absorbing layers includes a patternable photoresist.

2. The display of claim 1, wherein the apertures in each of the light absorbing layer and the light reflecting layer are substantially aligned.

3. The display of claim 1, wherein the light modulators include microelectromechanical system (MEMS)-based light modulators.

4. The display of claim 1, wherein the light modulators include shutter-based light modulators.

5. The display of claim 1, wherein at least one layer of the light absorbing layer coats the sides of the apertures defined in the light reflecting layer.

6. The display of claim 1, wherein the light reflecting layer comprises at least two light reflecting layers.

7. The display of claim 1, wherein the light reflecting layer comprises a dielectrically enhanced metal mirror, and the dielectrically enhanced metal mirror comprises:
   a metal layer; and
   a multiple layer stack of dielectric material layers, the multiple layer stack of dielectric material layers having alternating refractive indices.

8. The display of claim 7, wherein the multiple layer stack of dielectric material layers comprises:
   at least one first refractive index layer formed of a first refractive index greater than about 2.0; and
   at least one second refractive index layer formed of a second refractive index, that is less than about 1.8.

9. A display comprising:
   an aperture layer including a light absorbing layer disposed over a light reflecting layer, wherein the light reflecting layer defines a plurality of apertures, and at least one layer of the light absorbing layer coats the sides of the apertures defined in the light reflecting layer; and
   a plurality of light modulators for modulating light passing through the apertures defined in the aperture layer,
   wherein the light absorbing layer comprises one of a photosensitive resin and a patternable photoresist.

10. The display of claim 9, wherein the light modulators include microelectromechanical system (MEMS)-based light modulators.

11. The display of claim 9, wherein the light modulators include shutter-based light modulators.

12. The display of claim 9, wherein the light absorbing layer comprises at least two light absorbing layers.

13. A method of forming an aperture layer for a display, comprising:
   providing a substrate;
   depositing a light reflecting layer on the substrate;
   depositing a light absorbing layer over the light reflecting layer;
   forming a first plurality of openings in one of the light absorbing layer and the light reflecting layer; and
   forming a second plurality of openings in the other of the light absorbing layer and the light reflecting layer using the first plurality of openings as one of a photomask and an etch mask.

14. The method of claim 13, wherein the first plurality of openings is formed in the light absorbing layer, and the second plurality of openings is formed in the light reflecting layer by using the first plurality of openings in the light absorbing layer as an etch mask.

15. The method of claim 14, wherein:
forming the first plurality of openings in the light absorbing layer uncovers portions of the light reflecting layer through the first plurality of openings; and
forming the second plurality of openings includes removing the portions of the light reflecting layer uncovered by the first plurality of openings.

16. The method of claim 13, wherein the first plurality of openings is formed in the light reflecting layer and the second plurality of openings is formed in the light absorbing layer by using the first plurality of openings in the light reflecting layer as a photomask.

17. The method of claim 16, wherein the light absorbing layer includes a photosensitive material and forming the second plurality of openings in the light absorbing layer comprises photo-patterning the second plurality of openings in the photosensitive material through the first plurality of openings.

18. The method of claim 16, wherein forming the second plurality of openings in the light absorbing layer includes etching the first plurality of openings in the light reflecting layer prior to depositing the light absorbing layer over the light reflecting layer.

19. The method of claim 16, wherein forming the second plurality of openings in the light absorbing layer includes patterning the light absorbing layer by exposing the light absorbing layer to light through a rear surface of the substrate and through the first plurality of openings in the light reflecting layer.

20. The method of claim 16, wherein the second plurality of openings is formed such that the second plurality of openings is substantially aligned with the first plurality of openings.

\* \* \* \* \*